US006924839B2

(12) United States Patent
Eiho et al.

(10) Patent No.: US 6,924,839 B2
(45) Date of Patent: Aug. 2, 2005

(54) IMAGE-PROCESSING METHOD AND RECORDING MEDIUM IN WHICH SUCH AN IMAGE-PROCESSING METHOD IS RECORDED

(75) Inventors: Shigeru Eiho, Uji (JP); Kuraji Nitta, Wakayama (JP); Shoichi Dedachi, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 820 days.

(21) Appl. No.: 09/742,576

(22) Filed: Dec. 20, 2000

(65) Prior Publication Data
US 2001/0022622 A1 Sep. 20, 2001

(30) Foreign Application Priority Data
Dec. 27, 1999 (JP) ............................................ 11-370938

(51) Int. Cl.[7] ............................................... H04N 5/208
(52) U.S. Cl. ...................... 348/252; 348/241; 348/273; 382/266; 382/275
(58) Field of Search ................................. 348/273, 241, 348/252, 263; 382/23, 266, 269, 275, 263, 268; 375/240.27, 240.29

(56) References Cited

U.S. PATENT DOCUMENTS

| 4,571,635 | A |   | 2/1986  | Mahmoodi et al.  |          |
|-----------|---|---|---------|------------------|----------|
| 4,794,531 | A | * | 12/1988 | Morishita et al. | 382/132  |
| 5,245,432 | A | * | 9/1993  | Jaffray et al.   | 348/578  |
| 5,563,963 | A | * | 10/1996 | Kaplan et al.    | 382/266  |
| 5,787,195 | A | * | 7/1998  | Tsujimoto et al. | 382/176  |
| 5,880,767 | A | * | 3/1999  | Liu              | 347/251  |
| 5,881,164 | A | * | 3/1999  | Ichikawa         | 382/149  |
| 6,125,213 | A | * | 9/2000  | Morimoto         | 382/263  |
| 6,215,527 | B1| * | 4/2001  | Okamoto et al.   | 348/625  |
| 6,252,995 | B1| * | 6/2001  | Takamori         | 382/254  |
| 6,611,627 | B1| * | 8/2003  | LaRossa et al.   | 382/240  |
| 6,650,790 | B1| * | 11/2003 | Arbeiter et al.  | 382/275  |
| 6,665,447 | B1| * | 12/2003 | Chan             | 382/254  |
| 6,700,626 | B2| * | 3/2004  | Stessen et al.   | 348/627  |
| 6,714,665 | B1| * | 3/2004  | Hanna et al.     | 382/117  |
| 6,804,408 | B1| * | 10/2004 | Gallagher et al. | 382/272  |

FOREIGN PATENT DOCUMENTS

EP          1 073 014 A2    1/2001

OTHER PUBLICATIONS

Anil K. Jain, "Fundamentals of Digital Image Processing", 1989, Prentice Hall, pp. 249–251, 262–263, 351–353.*

Gonzalez, Rafael C. "Digital Image Processing" pp. 189–202 1992 Addison–Wesley Publishing Company Inc.*

*Picture Enhancement in Video and Block–Coded Image Sequences*, G. Scognamiglio, et al., IEEE Transactions on Consumer Electronics, IEEE Inc., N.Y., vol. 45, No. 3, pp. 680–689 (Aug., 1999).

(Continued)

Primary Examiner—Wendy R. Garber
Assistant Examiner—Nelson D. Hernandez
(74) Attorney, Agent, or Firm—David G. Conlin; Peter J. Manus; Edwards & Angell, LLP

(57) ABSTRACT

In a sharpening process of image data using a Laplacian operation, a parameter k for controlling the size of a Laplacian to be subtracted from an original image, a parameter θ for suppressing influences of noise and a parameter λ for suppressing an overshoot and an undershoot are respectively provided, and these parameters are altered in accordance with the state of an original image. Thus, it becomes possible to carry out the sharpening process on the image data without causing emphasized noise and occurrences of an overshoot and an undershoot.

35 Claims, 8 Drawing Sheets

OTHER PUBLICATIONS

*A Novel Digital Unsharp Masking Algorithm for Color Images*, Tie–Jun Shan, Proceedings of the SPIE, SPIE, Bellingham, VA, vol. 1771, pp. 41–46 (Jul., 1992).

*Chest Radiograph Enhancement Using the Weighted Unsharp Mask*, Jackson, et al., Proceedings of ISMII. IEEE Computer Society Int. Symposium on Medical Imaging and Image Interpretation, XX, pp. 10–13 (1982).

Polesel A., et al., *Adaptive Unsharp Masking for contrast enhancement*, 1997IEEE Comput. Soc, US, pp. 267–270XP010254160.

R.C. Gonzalez, et al., *Digital Image Processing*, 1992, XP002247092, pp. 195–197.

Kondo, H., et al., *One Approach For Image Edge Sharpening*, IEICE Transactions on Information and Systems, Institute of Electronics Information and Comm. Eng. Tokyo, JP, vol. E79–D, No. 5 (1996), pp. 620–624, XP00593281, ISSN: 0916–8532.

* cited by examiner

F I G. 5
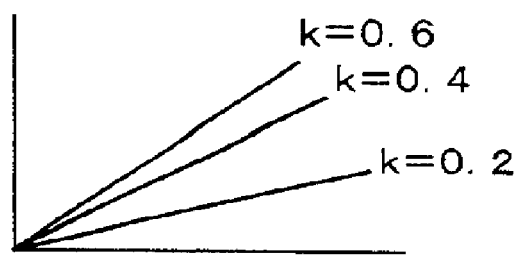
F I G. 6
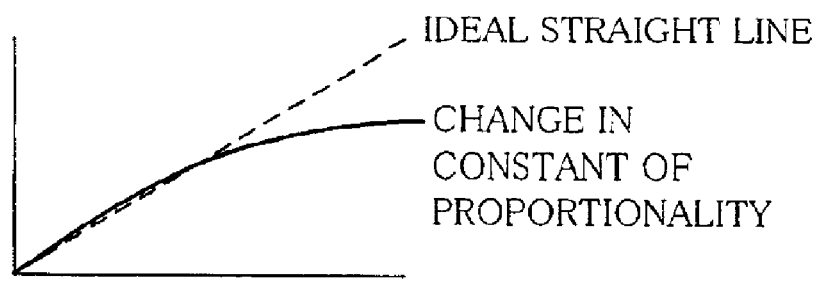

ORIGINAL SIGNAL

FIRST-ORDER DIFFERENTIAL

LAPLACIAN (ORIGINAL SIGNAL) - (LAPLACIAN)

ORIGINAL SIGNAL (ORIGINAL SIGNAL) − (LAPLACIAN)

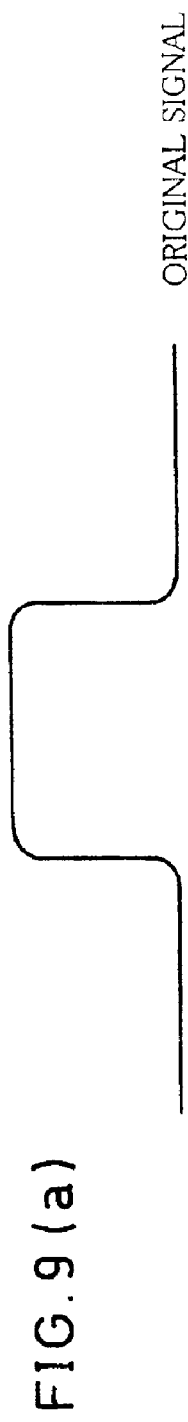
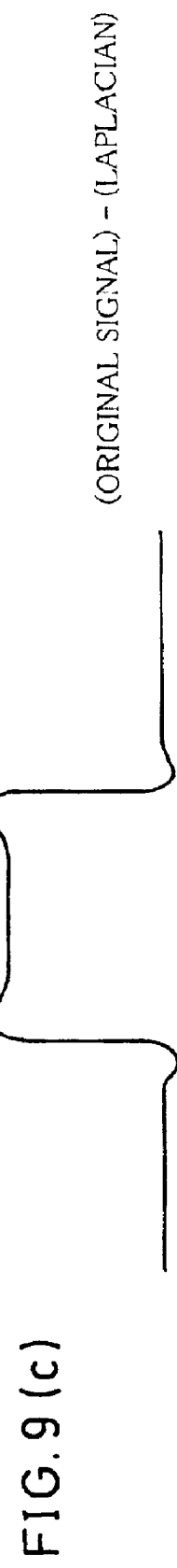
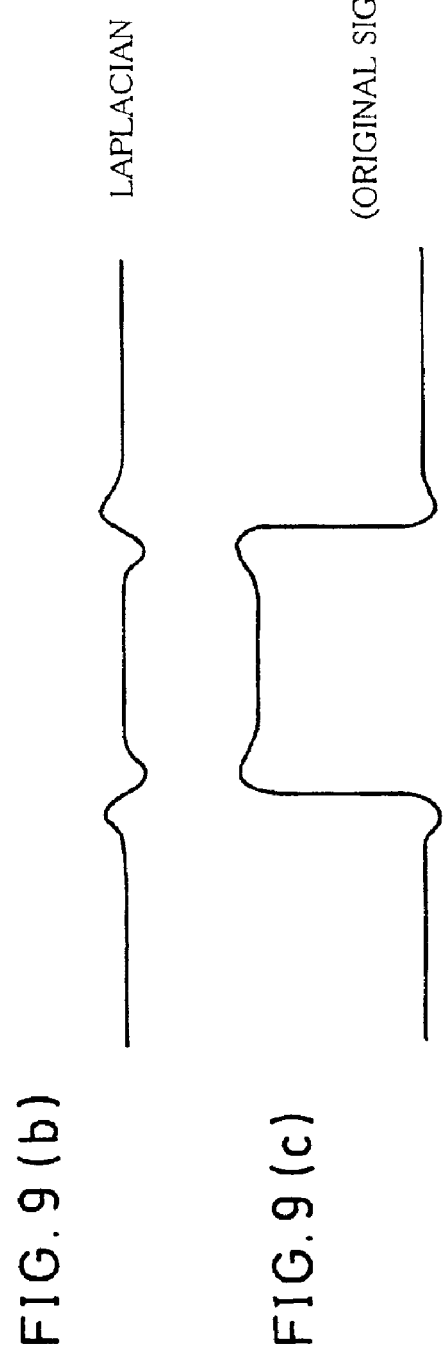
FIG. 9(a) ORIGINAL SIGNAL
FIG. 9(b) LAPLACIAN
FIG. 9(c) (ORIGINAL SIGNAL) − (LAPLACIAN)

IMAGE-PROCESSING METHOD AND RECORDING MEDIUM IN WHICH SUCH AN IMAGE-PROCESSING METHOD IS RECORDED

FIELD OF THE INVENTION

The present invention relates to an image-processing method for carrying out a sharpening process on digital image data.

BACKGROUND OF THE INVENTION

Conventionally, with respect to photographic printing devices for printing images such as photographs on photographic paper, analog printers, which expose photographic paper through a negative-working film bearing a photographic image recorded thereon, have been widely used. Moreover, various kinds of digital printers, which expose photographic paper based upon image data obtained by reading an image recorded in a negative-working film by a scanner, etc., as well as image data picked up by a digital camera, etc., have been proposed. In particular, the digital printer, when used in combination with an image-processing apparatus for carrying out image processing such as color correction and density correction on image data, makes it possible to perform color correction and density correction operations, etc. which have not been achieved by analog printers. Therefore, recently, the digital printer has come to be widely used because of its advantage of providing images quickly with ease in accordance with customers' demands.

Moreover, the recent developments of compact cameras and disposable cameras allow more and more ordinary people to have chances to take color pictures. Recent cameras, which are provided with functions such as an auto-focusing function and an automatic flashing function, make it possible even for those people who have not got used to taking pictures to take pictures with quite good quality to a certain extent. However, in the case of the auto-focusing function, it is difficult for the user to recognize which point the lens is focused, and in such a case when the main subject is not located in the center of the frame, a picture tends to be taken while the main subject is not being focused. Moreover, the automatic flashing function allows to take pictures with quite good quality to a certain extent even when taken under counter light; nevertheless, picked up images sometimes fail to have good quality. Moreover, picked up images tend to be blurred as a whole due to slight trembling in the hand at the time of taking pictures.

As described above, picked up images contain blurring due to various reasons. Therefore, in the image-processing apparatus, if there is blurring in an inputted digital image data, an image-processing operation referred to as a sharpening process is sometimes carried out thereon. The sharpening process is a process by which edges in an image are emphasized in order to restore degradation in an image due to blurring or to obtain a clearer image for a certain purpose. With respect to specific methods for the sharpening process, for example, an emphasizing method using first-order differential operations and an emphasizing method using second-order differential operations (Laplacian) have been proposed, and the emphasizing method using Laplacian has been widely used since a comparatively natural emphasizing treatment is obtained.

In the process using Laplacian, edge emphasizing is carried out by subtracting a Laplacian in each pixel of image data in question from each pixel value of the image data of an original image. Assuming that each pixel value of image data in an original image, that is, an original signal, is $f(i,j)$ ($i,j$ represent coordinates), and that the pixel value that has been subjected to a Laplacian process is $F(i,j)$, the above-mentioned process is represented by the following expression:

$$F(i,j)=f(i,j)-\nabla^2 f(i,j) \qquad (1)$$

Referring to FIGS. 7(a) through 7(d), the following description will discuss the above-mentioned processes.

FIG. 7(a) is an explanatory drawing that shows original image pixel data in which respective pixels are plotted in the horizontal direction and pixel values are plotted in the vertical direction; FIG. 7(b) shows the first-order differential value of an original image; FIG. 7(c) shows the Laplacian value of image data of the original image; and FIG. 7(d) is an explanatory drawing that shows the value (original signal)–(Laplacian value) that is obtained by expression (1).

The original signal shown in FIG. 7(a) has lower pixel values on the left side and higher pixel values on the right side with a border area located in the vicinity of the center thereof. The variation in the pixel values in the border area comparatively gentle, which shows that there is slight blurring in the edges.

When this original signal is subjected to a first-order differential operation, the resulting distribution has a maximum value in the center of the border area, as shown in FIG. 7(b). When this is further subjected to a differential operation to obtain a Laplacian, the resulting distribution has a maximum value on the left side of the border area and a minimum value on the right side thereof, as shown in FIG. 7(c). In the case when this Laplacian is subtracted from the original signal, in the original signal, the values in a portion shifting from the area on the left side having low pixel values to the border area are further reduced by being subtracted by the maximum value on the left side in the Laplacian. Moreover, in the original signal, the values in a portion shifting from the border area to the area on the right side having high pixel values are further increased by being subtracted by the minimum value on the right side in the Laplacian (actually added, because the minimum value is a negative value). Therefore, as shown in FIG. 7(d), the variation in the pixel values in the border area becomes steep as compared with the original signal, thereby making it possible to suppress blurring and to emphasize the edges.

Processes shown in FIGS. 7(a) through 7(d) are explained as follows based upon an expression: The right side of expression (1) is transformed as follows:

$$f(i,j)-\nabla^2 f(i,j)=9f(i,j)-(f(i+1,j)+f(i-1,j)+(f(i,j+1)+f(i,j-1)+f(i+1,j+1)+\\f(i-1,j+1)+f(i+1,j-1)+f(i-1,j-1)) \qquad (2)$$

Here, for convenience of explanation, the above-mentioned expression (2) is formed on the assumption that a 3×3 matrix is made centered on a target pixel. In expression (2), in the case when a pixel indicated by coordinates (i,j) is located in the vicinity of the center of the inclination in the pixel value variation, that is, in an area having hardly any variation in the inclination, or in an area having hardly any pixel value variation, $\nabla^2 f(i,j)=0$, and this becomes $F(i,j)=f(i,j)$ since $F(i,j)=f(i,j)-\nabla^2 f(i,j)$, which indicates that there is hardly any variation in the pixel value.

In contrast, in the case when a pixel indicated by coordinates (i,j) is located in a lower portion of the inclination in the pixel value variation, that is, on the side having lower pixel values in an edge, there are many pixels having pixel values greater than $f(i,j)$ located on the periphery of the coordinate (i,j). Therefore, the sum total of the pixel values of the 8 pixels on the periphery of the coordinates (i,j), that is, the second term and thereafter of the right side of expression (2), is greater than 8 times the pixel value of f(i,j). Therefore, f(i,j)−$\nabla^2$f (i,j)<f(i,j) holds, and the pixel value becomes slightly smaller.

In contrast, in the case when a pixel indicated by coordinates (i,j) is located in an upper portion of the inclination in the pixel value variation, that is, on the side having higher pixel values in an edge, there are many pixels having pixel values smaller than f(i,j) located on the periphery of the coordinate (i,j). Therefore, the sum total of the pixel values of the 8 pixels on the periphery of the coordinates (i,j), that is, the second term and thereafter of the right side of expression (2), is smaller than 8 times the pixel value of f(i,j). Therefore, f(i,j)−$\nabla^2$f (i,j)>f(i,j) holds, and the pixel value becomes slightly greater.

In this manner, in an edge of an image, the application of the image processing by the use of Laplacian operations allows the side having lower pixel values to have further lower values, and also allows the side having higher pixel values to have further higher values, thereby making it possible to emphasize the edge.

As described above, the application of the image processing by the use of Laplacian operations makes it possible to reduce blurring in an image by emphasizing edges in the image; in contrast, at the same time, problems such as amplified noise and occurrences of an overshoot and an undershoot tend to arise.

First, the following description will discuss how noise is amplified. FIG. 8(a) shows an original signal in an image having noise, in which respective pixels are plotted in the horizontal direction and pixel values are plotted in the vertical direction; and FIG. 8(b) shows the value (original signal)−(Laplacian value) that is obtained by expression (1). As clearly shown by the comparison between FIGS. 8(a) and 8(b), noise is amplified due to the application of the image processing by the use of Laplacian operations. An explanation will be given of this fact based upon specific numeric values.

TABLE 1

| Original Signal A | 100 | 100 | 100 | 100 | 125 | 100 | 100 | 100 | 100 |
|---|---|---|---|---|---|---|---|---|---|
| Laplacian B | 0 | 0 | 0 | 25 | −150 | 25 | 0 | 0 | 0 |
| A−B | 100 | 100 | 100 | 75 | 175 | 75 | 100 | 100 | 100 |

In Table 1, respective figures on the first row show respective pixel values in an original signal one-dimensionally aligned, and this shows a state in which noise indicated by a pixel value of 125 is included at one portion in uniform image data having a pixel value of 100. Figures on the second row show Laplacians corresponding to the original signals on the first row, in which pixels having no variation in the pixel values are represented by 0, pixels adjacent to a pixel having noise on both of the sides are represented by 25, and the pixel having noise is represented by −50. Figures on the third row show (original signal)−(Laplacian), and pixels having no variation in the pixel values are represented by 100 which is the same as the original signal; however, in the case of the pixels adjacent to the pixel having noise on both of the sides, the value is reduced to 75, and in the case of the pixel having noise, the value is increased to 175.

In this manner, the noise indicated by a pixel value of 125 in the original signal, is increased to 175 in the pixel value through the image processing by the use of Laplacian, indicating that the noise is greatly amplified. Moreover, since the pixel values of the pixels adjacent to the pixel having noise are slightly decreased, with the result that noise becomes even more conspicuous.

Next, the following description will discuss how an overshoot and an undershoot occur. FIG. 9(a) shows an original signal in an image having comparatively clear edges in which positions of respective pixels are plotted in the horizontal direction and pixel values are plotted in the vertical direction; FIG. 9(b) shows the Laplacian value of the original signal; and FIG. 9(d) shows the value (original signal)−(Laplacian value) that is obtained by expression (1). As clearly shown by FIG. 9(c), the application of the image processing by the use of Laplacian operations to an image having comparatively clear edges makes the side having lower pixel values have further lower values, and also makes the side having higher pixel values have further higher values, centered on an edge, which indicates that there are an undershoot and an overshoot occurring in the image. An explanation will be given of this fact based upon specific numeric values.

TABLE 2

| Original Signal C | 100 | 100 | 100 | 150 | 150 | 150 | 100 | 100 | 100 |
|---|---|---|---|---|---|---|---|---|---|
| Laplacian D | 0 | 0 | 50 | −50 | 0 | −50 | 50 | 0 | 0 |
| C−D | 100 | 100 | 50 | 200 | 150 | 200 | 50 | 100 | 100 |

In Table 2, respective figures on the first row show respective pixel values in an original signal one-dimensionally aligned, and this shows a state in which pixel areas having a pixel value of 100 and pixel areas having a pixel value of 150 are adjacent to each other, that is, a state in which values abruptly change at an edge. Figures on the second row show Laplacians corresponding to the original signals on the first row, in which: pixels having no variation in the pixel values are represented by 0; each pixel having a pixel value of 100, which is adjacent to a pixel having a pixel value of 150, has a Laplacian of 50; and each pixel having a pixel value of 150, which is adjacent to a pixel having a pixel value of 100, has a Laplacian of −50. Figures on the third row show (original signal)−(Laplacian), and pixels having no variation in the pixel values are allowed to have the same value as the original image pixel data; however, in the case of the pixels having a pixel value of 100, which are adjacent to the pixel having a pixel value of 150, the value is reduced to 50, and in the case of the pixels having a pixel value of 150, which are adjacent to the pixel having a pixel value of 100, the value is increased to 200.

This shows that, in the case when the image processing by the use of Laplacian operations is applied to an image having comparatively clear edges, an overshoot and an undershoot occur in the vicinity of an edge. Such a process causes, for example, the following phenomena: in a photographic image in which a light subject is located on a dark background, the peripheral portion of the subject becomes unnecessarily bright, or a dark edge appears on the background around the subject; thus, unnatural photographic images tend to be produced.

SUMMARY OF THE INVENTION

The objective of the present invention is to provide an image-processing method and a recording medium in which such an image-processing program is recorded, which, upon carrying out a sharpening process on digital image data, makes it possible to prevent problems such as emphasized noise and occurrences of an overshoot and an undershoot.

In order to achieve the above-mentioned objective, an image-processing method in accordance with the present invention, which carries out a sharpening process by subtracting second-order differential with respect to each pixel, obtained by defining the distribution of image data of an original image as a function, from the image data of the original image, is characterized in that the degree of the sharpening process is controlled by altering a first parameter for determining the size of the second-order differential to be subtracted from the image data of the original image.

In the above-mentioned method, the first parameter is allowed to determine the size of the second-order differential to be subtracted from the image data of the original image, and the first parameter can be altered. In other words, in response to a state of blurring occurring in an original image, the first parameter is altered so that an image-processing operation is carried out so as to obtain a desirable sharpened state.

Moreover, another image-processing method in accordance with the present invention, which carries out a sharpening process by subtracting second-order differential with respect to each pixel, obtained by defining the distribution of image data of an original image as a function, from the image data of the original image, is characterized in that the second-order differential is obtained by the sum total of differences between a target pixel and a plurality of pixels in the vicinity thereof, and each of the differences is multiplied by a coefficient, with the coefficient being varied depending on the size of the corresponding difference.

The second-order differential is basically obtained by the sum total of differences between the pixel values of the target pixel and a plurality of pixels in the vicinity thereof, and in the above-mentioned method, each of the pixel values is multiplied by a coefficient, and each coefficient is altered in accordance with the size of the corresponding difference. In other words, for example, in an arrangement where, as the difference becomes greater, the corresponding coefficient is also made greater, the second-order differential becomes less susceptible to influences from those peripheral pixels having small differences. Therefore, for example, even if slight noise appears on the peripheral pixels, it is possible to regulate the second-order differential from including the influences of the noise, and consequently to prevent the noise from being emphasized by the sharpening process.

Moreover, still another image-processing method in accordance with the present invention, which carries out a sharpening process by subtracting second-order differential with respect to each pixel, obtained by defining the distribution of image data of an original image as a function, from the image data of the original image, is characterized in that the second-order differential is provided with an upper limit and/or a lower limit, and the degree of the sharpening process is controlled by altering a third parameter for determining the upper limit and/or the lower limit.

In accordance with the above-mentioned method, since the second-order differential is provided with an upper limit and/or a lower limit, it is possible to prevent an area in an original image having sufficiently emphasized edges from being further subjected to an unnecessary edge emphasizing process. This makes it possible to solve the problem of occurrences of an overshoot and an undershoot in an image that has been subjected to the sharpening process. Moreover, since the value of the upper limit and/or lower limit can be changed by a third parameter, the value of the upper limit can be changed so that an image-processing operation is carried out so as to obtain a desirable sharpened state.

A recording medium in which the image-processing program in accordance with the present invention is recorded, is a recording medium in which is recorded an image-processing program for allowing a computer to carry out a sharpening process by subtracting second-order differential with respect to each pixel, obtained by defining the distribution of image data of an original image as a function, from the image data of the original image, is characterized in that the degree of the sharpening process is controlled by altering a first parameter for determining the size of the second-order differential to be subtracted from the image data of the original image.

In the program recorded in the above-mentioned recording medium, the first parameter is allowed to determine the size of the second-order differential to be subtracted from the image data of the original image, and the first parameter can be altered. In other words, in response to a state of blurring occurring in an original image, the first parameter is altered so that an image-processing operation is carried out so as to obtain a desirable sharpened state.

Moreover, another recording medium in which the image-processing program in accordance with the present invention is recorded, is a recording medium in which is recorded an image-processing program for allowing a computer to carry out a sharpening process by subtracting second-order differential with respect to each pixel, obtained by defining the distribution of image data of an original image as a function, from the image data of the original image, is characterized in that the second-order differential is obtained by the sum total of differences between a target pixel and a plurality of pixels in the vicinity thereof, and each of the differences is multiplied by a coefficient, with the coefficient being varied depending on the size of the corresponding difference.

The second-order differential is basically obtained by the sum total of differences between the pixel values of the target pixel and a plurality of pixels in the vicinity thereof, and in the above-mentioned method, each of the pixel values is multiplied by a coefficient, and each coefficient is altered in accordance with the size of the corresponding difference. In other words, for example, in an arrangement where, as the difference becomes greater, the corresponding coefficient is also made greater, the second-order differential becomes less susceptible to influences from those peripheral pixels having small differences. Therefore, for example, even if slight noise appears on the peripheral pixels, it is possible to regulate the second-order differential from including the influences of the noise, and consequently to prevent the noise from being emphasized by the sharpening process.

Furthermore, still another recording medium in which the image-processing program in accordance with the present invention is recorded, is a recording medium in which is recorded an image-processing program for allowing a computer to carry out a sharpening process by subtracting second-order differential with respect to each pixel, obtained by defining the distribution of image data of an original image as a function, from the image data of the original image, is characterized in that the second-order differential is provided with an upper limit and/or a lower limit, and the degree of the sharpening process is controlled by altering a third parameter for determining the upper limit and/or the lower limit.

In the program recorded in the above-mentioned recording medium, since the second-order differential is provided with an upper limit and/or a lower limit, it is possible to prevent an area in an original image having sufficiently emphasized edges from being further subjected to an unnecessary edge emphasizing process. This makes it possible to solve the problem of occurrences of an overshoot and an undershoot in an image that has been subjected to the sharpening process. Moreover, since the value of the upper limit and/or lower limit can be changed by a third parameter, the value of the upper limit can be changed so that an image-processing operation is carried out so as to obtain a desirable sharpened state.

For a fuller understanding of the nature and advantages of the invention, reference should be made to the ensuing detailed description taken in conjunction with the accompanying drawings.

BRIEF DESCRIPTION OF THE DRAWINGS

FIG. 5 is a graph that shows the average value of the chrominance differential values of an original image on the axis of abscissa, and also shows the average value of the chrominance differential values of the image after having been subjected to the sharpening operation on the axis of ordinate with respect to the values of k.

FIG. 6 shows a graph in which the value of k is plotted on the axis of abscissa with the constant of proportionality $a_k$ being plotted on the axis of ordinate in response to the value of k.

FIG. 9(a) is an explanatory drawing that shows original image pixel data in an image having comparatively clear edges in which respective pixels are plotted in the horizontal direction and pixel values are plotted in the vertical direction; FIG. 9(b) shows the Laplacian value of image data of the original image; and FIG. 9(c) is an explanatory drawing that shows the value (original image pixel data)−(Laplacian value) that is obtained by expression (1).

DESCRIPTION OF THE EMBODIMENTS

Referring to FIGS. 1 through 6, the following description will discuss one embodiment of the present invention.

Figure 2:
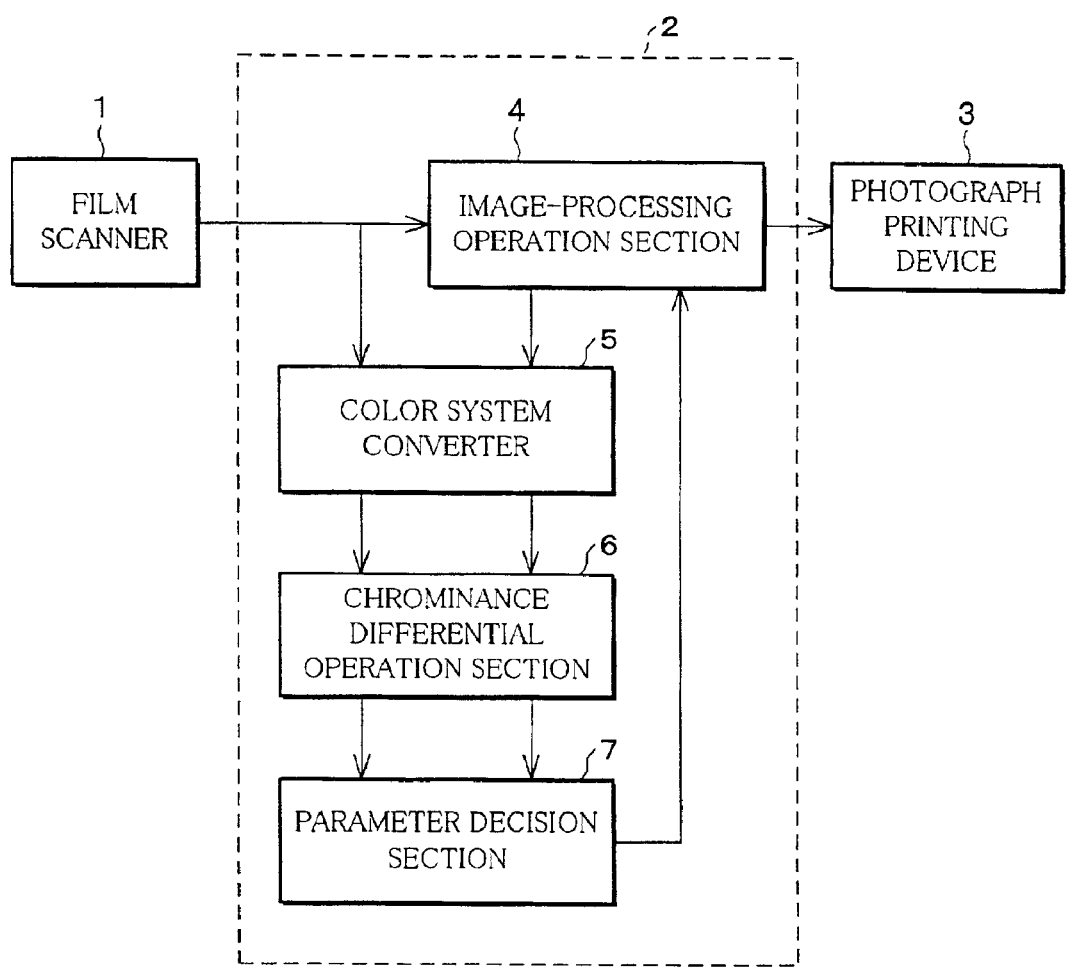
FIG. 2 is a block diagram that shows a schematic construction of an image outputting system in accordance with one embodiment of the present invention.

FIG. 2 is a block diagram that shows a schematic construction of an image output system in accordance with the embodiment of the present invention. The image output system is constituted by a film scanner 1, an image processor 2 and an photograph-printing device 3.

The film scanner 1, for example, directs light from a light-source onto a negative-working film that is a photographic film, and reads an image recorded in the negative-working film by receiving the transmitted light by a CCD (Charge Coupled Device), etc. The film scanner 1 outputs the image data thus read to the image processing device 2 for each of the red component, green component and blue component in a separate manner.

Based upon image data processed by the image processing device 2, the photograph-printing device 3 prints an image on photographic paper by exposing the photographic paper that is a photosensitive material. With respect to the head for irradiating the photographic paper with light in accordance with the digital image data, a light modulation element which can modulate irradiation light to the photographic paper for each pixel in accordance with the digital image data is used. With respect to the light modulation element, for example, a PLZT exposure head, a DMD (Digital Micromirror Device), a LCD (liquid crystal device), an LED (Light Emitting Diode) panel, a laser, a FOCRT (Fiber Optic Cathode Ray Tube), a CRT (Cathode Ray Tube), etc. are used.

Here, the photograph-printing device 3 may be provided as an auto printer which can carry out both the scanning process of the negative-working film and the exposing process for the photographic paper. In this case, the photograph-processing device may have a construction in which the auto printer which can carry out a sequence of processes from the image-reading process to the printing process and an image-processing device 2 constituted by a PC (Personal Computer), etc. are connected to each other; thus, it becomes possible to simplify the system.

The image-processing device 2 carries out a sharpening process on image data sent from the film scanner 1, and supplies the sharpened image data to the photograph-printing device 3. The image-processing device 2 is provided with an image-processing operation section 4, a color system converter 5, a chrominance differential operation section 6 and a parameter decision section 7.

The picture processing operation section 4 is a block which carries out a sharpening process on the image data sent from the film scanner 1 by using a Laplacian operation, which will be described later. The color system converter 5 is a block which carries out a color system conversion, which will be described later, on the image data sent from the film scanner 1 and the image data that has been processed by image-processing operation section 4. The chrominance differential operation section 6 executes an operation on the chrominance differential value for each pixel with respect to the image data whose color system has been converted by the color system converter 5. The parameter decision section 7 is a block for determining parameters that are used in the operation of the picture processing operation section 4.

Next, a detailed explanation will be given of a method of the sharpening process in the image-processing device 2. In the present embodiment, the sharpening process is carried out by using a Laplacian system as described below.

Assuming that pixel values R, G, B of each pixel are $f_R(i,j)$, $f_G(i,j)$, $f_B(i,j)$ (i,j represent coordinates), and that the pixel values that have been subjected to Laplacian processes are $g_R(i,j)$, $g_G(i,j)$, $g_B(i,j)$, the Laplacian processes in the present embodiment are represented by the following expressions:

$$g_R(i,j)=f_R(i,j)-k\nabla'^2 f_R(i,j) \quad (3)$$

$$g_G(i,j)=f_G(i,j)-k\nabla'^2 f_G(i,j) \quad (4)$$

$$g_B(i,j)=f_B(i,j)-k\nabla'^2 f_B(i,j) \quad (5)$$

In the above expressions, the operation indicated by $\nabla'^2 f(i,j)$ is a Laplacian operation newly defined in this embodiment, which will be descried later in detail.

As shown by the expressions (3) through (5), the Laplacian process features that it is carried out on each of the pixel values of R, G, B of the original signal. In contrast, for example, in conventional systems, even when original signals are obtained as color information, the pixel values of each pixel are converted into gray gradation, and only based upon the lightness, the Laplacian process is carried out. In this case, it is not possible to carry out an edge emphasizing process on a portion in which an edge is formed by changes in hues although the lightness of the hues is virtually the same. In contrast, as described above, in the Laplacian process in the present embodiment, since the Laplacian process is carried out on the pixel values of R, G, B of the original image data, the emphasizing process can be carried out on a portion in which pixel values change in the respective color components. Therefore, the edge emphasizing process is carried out not only on changes in lightness, but also on changes in hues.

Moreover, in the above-mentioned expressions (3) through (5), k represents a parameter (first parameter) for controlling the degree of edge-emphasis. In the case of K=1, the operation that is the same as the conventional Laplacian process is carried out on each of the pixel values of R, G, B. In the case of k<1, the degree of edge-emphasis is weakened, and in the case of k>1, the degree of edge-emphasis is strengthened.

Here, in the above-mentioned expressions (3) through (5), the coefficient to the Laplacians are all set to the same value k; however, different coefficients may be used for the respective expressions. However, in the case when different coefficients are used for the respective expressions, since the emphasis of the correction obtained by the Laplacian operation differs depending on the respective color components, the hues in a pixel that is subject to the correction might change greatly.

Next, an explanation will be given of a Laplacian represented by the above-mentioned $\nabla'^2 f_K(i,j)$. The above-mentioned Laplacian $\nabla'^2 f_K(i,j)$ is defined by the following expression:

$$\nabla'^2 f_K(i,j) = \sigma_{i,j} \min\{|\nabla''^2 f_K(i,j)|, \lambda/\Delta C(i,j)\} \quad (6)$$

where $$\sigma_{i,j} = \begin{cases} 1 & (\nabla''^2 f_K(i,j) \geq 0) \\ -1 & (\nabla''^2 f_K(i,j) < 0) \end{cases} \quad (7)$$

In the above-mentioned expression (6), the operation represented by $\nabla''^2 f_K(i,j)$ shows a Laplacian which has been newly defined by the present invention. This will be explained later. Moreover, in the above-mentioned expression, $\Delta C(i,j)$ represents a chrominance differential value. This chrominance differential value will be also discussed later.

As described earlier, in the case when a Laplacian process is carried out on a field which is originally clear in its edge portion, an overshoot and an undershoot occur, resulting in an unnatural image. This is because in a field where the density difference is great, the absolute value of the Laplacian also becomes greater, resulting in an increase in the variation in density due to edge-emphasis.

In order to suppress such an overshoot and an undershoot, it has been proposed that an upper limit is provided in the absolute value of the Laplacian; however, in the case when the upper limit is set to a constant value, if there are blurred portions and non-blurred portions in an image, or if there are portions having different degrees of blurring, problems arise. The reason for this is explained as follows: since the absolute value of the Laplacian tends to become greater as the edge becomes sharper, in the case where there is a sharp edge, a fringe tends to appear. In order to suppress this, the upper limit of the absolute value of the Laplacian needs to be adjusted to the portion having the sharpest edge of the image. This results in a week degree of sharpness in portions having high degrees of blurring.

In order to solve this problem, $\nabla'^2 f_K(i,j)$ is set so as to satisfy the above-mentioned expressions (6) and (7); thus, it becomes possible to set the upper limit of the absolute value of the Laplacian to be smaller in the case where there is a sharp edge, and greater in the case where there is a less-distinct edge.

In expression (6), the greater the value of the chrominance differential $\Delta C(i,j)$, that is, the greater the variation in the pixel value in an area, the smaller the upper limit of the absolute value in the Laplacian, and this indicates that the upper limit of the absolute value of the Laplacian becomes smaller in the area having a stronger edge. Moreover, the smaller the value of the chrominance differential $\Delta C(i,j)$, that is, the smaller the variation in the pixel value in an area, the greater the upper limit of the absolute value in the Laplacian, and this indicates that the upper limit of the absolute value of the Laplacian becomes greater in the area having a less-distinct edge.

Moreover, in expression (6), as the value of $\lambda$ increases, the upper limit of the absolute value of the Laplacian becomes greater, making the suppressing effects on the overshoot and undershoot smaller. In contrast, as the value of $\lambda$ decreases, the upper limit of the absolute value of the Laplacian becomes smaller, making the suppressing effects on the overshoot and undershoot greater. In other words, $\lambda$ (third parameter) serves as a parameter to control the suppressing effects on the overshoot and undershoot.

Here, the above-mentioned expressions (6) and (7) give one example of operations by which the upper limit of the absolute value of a Laplacian is set and the upper limit is made smaller at an area having a distinct edge while it is made greater at an area having a less-distinct edge; therefore, any operations may be used as long as the same functions are achieved. Moreover, in the operations using expressions (6) and (7), the upper limit and/or lower limit is set to the Laplacian so that the operations are carried out to obtain effects as in the case of a limiter. Alternatively, another operational expressions may be set in which, for example, a threshold value is set to the absolute value of a Laplacian, and the amount exceeding the threshold value is compressed at a certain ratio so that the operations are carried out to obtain effects as in the case of a compressor.

Next, an explanation will be given of a Laplacian represented by $\nabla''^2 f_K(i,j)$ used in the above-mentioned expression (6). The above-mentioned $\nabla''^2 f_K(i,j)$ is defined by the following expressions.

$$\nabla''^2 f_K(i,j) = \equiv_{i,j}^{(1,0)} \{f(i+1,j)-f(i,j)\}$$
$$+\delta_{i,j}^{(-1,0)} \{f(i-1,j)-f(i,j)\}$$

$$+\delta_{i,j}^{(0,1)}\{f(i,j+1)-f(i,j)\}$$

$$+\delta_{i,j}^{(0,-1)}\{f(i,j-1)-f(i,j)\}$$

$$+\delta_{i,j}^{(1,1)}\{f(i+1,j)-f(i,j)\}$$

$$+\delta_{i,j}^{(-1,1)}\{f(i-1,j+1)-f(i,j)\}$$

$$+\delta_{i,j}^{(1,-1)}\{f(i+1,j-1)-f(i,j)\}$$

$$+\delta_{i,j}^{(-1,-1)}\{f(i-1,j-1)-f(i,j)\} \quad (8)$$

where $$\delta_{i,j}^{(1,0)} = \begin{cases} 1 & (|f(i+1,j)-f(i,j)| > \theta) \\ 0 & (|f(i+1,j)-f(i,j)| \leq \theta) \end{cases} \quad (9)$$

As described earlier, when an area containing noise in an original image is subjected to a Laplacian process, the noise is amplified with the result that degradation occurs in the image quality. In order to suppress such an amplification of the noise, the Laplacian is defined as indicated by the above-mentioned expressions (8) and (9), and in the case when the difference in the density from the adjacent pixels is not more than a constant θ, the Laplacian with respect to the pixel is not allowed to contain the influences from the adjacent pixels. In other words, it is judged that a pixel whose density difference from the peripheral pixels is comparative small is noise.

In expressions (8) and (9), as the value of θ increases, the emphasizing effect of the Laplacian process becomes weaker, although the effect for suppressing the amplification of noise increases. Moreover, as the value of θ decreases, the emphasizing effect of the Laplacian process increases although the effect for suppressing the amplification of noise decreases. In other words, θ serves as a parameter (second parameter) for controlling the suppressing effect on noise amplification.

Here, the above-mentioned expressions (8) and (9) only give one example of operations for suppressing the amplification of noise, and any operation may be used as long as it has the same functions. For example, in expression (9), $\delta^{i,j(1,0)}$ is supposed to have either 1 or 0, it may be given as a functional value that varies depending on the size of $|f(i+1,j)-f(i,j)|$.

Here, the following description will discuss the above-mentioned chrominance differential value ΔC(i,j). First, an explanation will be given of the L*a*b* color system and the chrominance.

A difference in colors, which is perceived between two perceptual colors, is referred to as chrominance. Among perceptual color spaces, those spaces in which the uniformity of chrominance is intended are referred to as even color space. Those spaces defined as even color spaces include CIE (Commission International de l'Eclairage) 1964 U*V*W* color space, CIE 1976 L*u*v* color space, and CIE 1976 L*a*b* color space, and in this embodiment, the L*a*b* color space is used. Here, conversion of image data from the RGB color space to the L*a*b* color space is carried out based upon the following expressions:

First, the following expression is used so as to convert the RGB color system to the CIEXYZ color system.

$$\begin{bmatrix} X \\ Y \\ Z \end{bmatrix} = \begin{bmatrix} 0.608 & 0.174 & 0.200 \\ 0.299 & 0.587 & 0.114 \\ 0.000 & 0.066 & 1.112 \end{bmatrix} \begin{bmatrix} R \\ G \\ B \end{bmatrix} \quad (10)$$

Next, this is converted to $(X_C, Y, Z_C)$ data.

$$\begin{aligned} X_C &= 1.020\ X \\ Z_C &= 0.847\ Z \end{aligned} \quad (11)$$

Here, the coefficient of expression (11) is introduced so as to standardize X and Z of expression (10) with respect to R=G=B=1. With respect to the $(X_C, Y, Z_C)$ data, the lightness index number L and the perceptual color index number (a, b) are obtained from the following expressions:

$$\begin{aligned} L &= 9.2\ V(Y) \\ a &= 40\{V(X_C)-V(Y)\} \\ b &= \{V(Y)-(Z_C)\} \end{aligned} \quad (12)$$

where $$V(x)=11.6x^{1/3}-1.6\ (x>0.01) \quad (13).$$

Therefore, the following expressions are obtained:

$$\begin{aligned} L &= 106.7\ Y^{1/3} - 14.72 \\ a &= 464\ (X_C^{1/3} - Y^{1/3}) \\ b &= 185.6\ (Y^{1/3} - Z_C^{1/3}) \end{aligned} \quad (14)$$

In this case, on the assumption of Y=1 in the first equation of expression (14), L=92.0 is obtained. Here, since L* is formed so as to be ten times the Munsell value, when Y=1, it is preferable to satisfy L=100. Therefore, the respective equations of expression (14) are multiplied by (100.0/92.0=) 1.087, resulting in the following expressions. Here, the respective symbols are changed as follows: L→L*, a→a*, b→b*, and the coefficients are simplified.

$$\begin{aligned} L^* &= 116Y^{1/3} - 16 \\ a^* &= 500(X_C^{1/3} - Y^{1/3}) \\ b^* &= 200(Y^{1/3} - Z_C^{1/3}) \end{aligned} \quad (15)$$

This expression (15) defines the L*a*b* color space. Then, the rectilinear distance between two points representative of two perceptual colors in the L*a*b* color space, that is, the chrominance ΔE is obtained by the following expression:

$$\Delta E = [(\Delta L^*)^2 + (\Delta a^*)^2 + (\Delta b^*)^2]^{1/2} \quad (16)$$

Moreover, with respect to each pixel point (i,j), among the chrominances ΔE from all the adjacent points, the greatest one is set to as the chrominance differential value ΔC(i,j). The definition of this type makes the value of ΔC(i,j) greater along a border area in a color image, and also makes the value of ΔC(i,j) smaller in the other areas.

Here, base upon the above-mentioned definition, a chrominance differential operation was carried out on actual color image data, and the results show that great chrominance differential values appear in dark areas in the image other than border areas. It is assumed that, in the dark areas, that is, the areas where the value of the $(X_C, Y, Z_C)$ data is small, since V(x), given by the aforementioned expression (13), has a great gradient within a range where the value of x is small, even a slight difference in the data values of ($X_C$, Y, $Z_C$) is enlarged when converted to a difference in the data values of (L*, a*, b*).

Therefore, in the present embodiment, the L*a*b* color system is revised as follows: first, with respect to V(x), it is newly defined as shown in the following equation so as to make its gradient constant; thus, even within the range where the value of x is small, it is possible to prevent the gradient from increasing.

$$V(x) = 10x \quad (17)$$

When V(x) is defined in this manner, L*, a*, b* are respectively defined as follows:

$$\left. \begin{array}{l} L^* = 100\,Y \\ a^* = 434.8\,(X_C - Y) \\ b^* = 173.9\,(Y - Z_C) \end{array} \right\} \quad (18)$$

After the L*a*b* color system had been revised as described above, a chrominance differential operation was carried out on actual color image data in the same manner as described above, and the results show that great chrominance differential values no longer appear in dark areas in the image other than border areas. However, it is found that great chrominance differential values appear in light areas in the image other than border areas. This is because in the areas where the value of x is small, the gradient of V(x) becomes smaller than that before the revision, while in the areas where the value of x is great, the gradient of V(x) becomes greater than that before the revision.

Therefore, in order to allow the characteristics of the L*a*b* color system before and after the revision to properly demonstrate, another revision is applied. That is, in the areas where the value of x is great, V(x) before the revision is used, while in the areas where the value of x is small, V(x) after the revision is used. With respect to the value of x forming the turning point, in the expression before the revision, V(x)=11.6$x^{1/3}$−1.6 (expression (13)), a point which sets the value of the gradient to 10, that is, x=0.2404, is taken. This is represented by the following expression:

$$V(x) = \begin{cases} 10x & (x < 0.2404) \\ 11.6x^{(1/3)} - 4.809 & (x \geq 0.2404) \end{cases} \quad (19)$$

Here, in the present embodiment, the L*a*b* color system is used only upon calculating the chrominance; and since the chrominance is determined only by data values of (ΔL*, Δa*, Δb*), the data values of (L*, a*, b*) themselves are not so important. Therefore, the value of the gradient of V(x), that is, ΔV(x), is important, and the value of V(x) itself is indifferent. Consequently, in the above-mentioned expression (19), a bias of −3.209 is applied to V(x) in the range of x≧0.2404 so as to connect V(x) continuously at x=0.2404.

The L*a*b* color system is further revised by applying the following equations to V(x) obtained from expression (19):

$$\left. \begin{array}{l} L^* = 10V\,(Y) \\ a^* = 43.48\,\{V(X_C) - V(Y)\} \\ b^* = 17.39\,\{V(Y) - V(Z_C)\} \end{array} \right\} \quad (20)$$

In the revised L*a*b* color space defined by expression (20), based upon the above-mentioned expression (16), the chrominance ΔE was calculated, and with respect to each pixel point (i,j), among the chrominances ΔE from all the adjacent points, the greatest one is set to as the chrominance differential value ΔC (i,j). Then, the operation of the expression (6) is carried out by using the chrominance differential value ΔC (i,j) obtained as described above.

Figure 3:
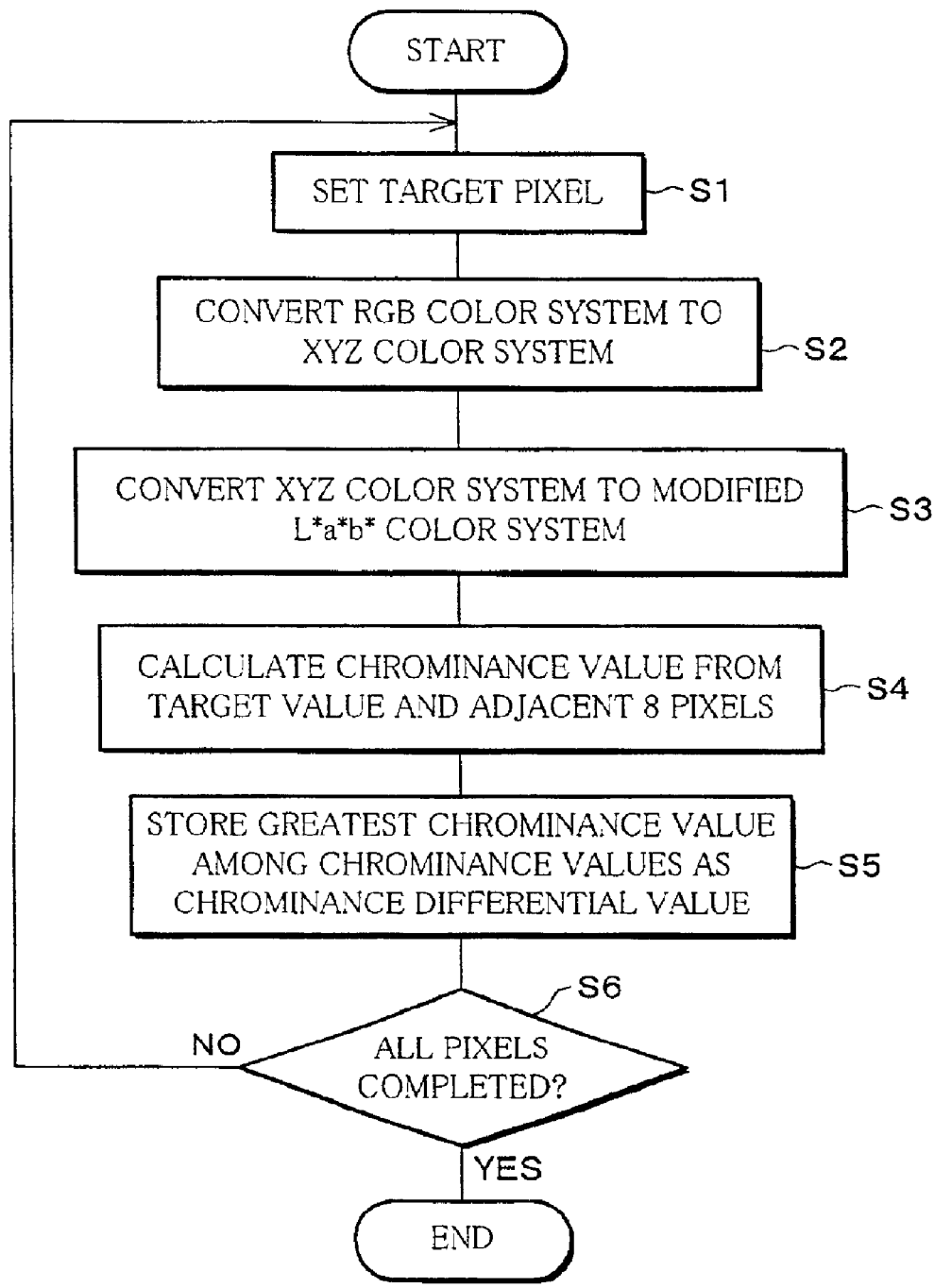
FIG. 3 is a flow chart that shows a sequence of operations to find chrominance differential values.

Here, based upon a flow chart in FIG. 3, an explanation will be given of a sequence of the above-mentioned operations of the chrominance differential value.

First, a target value is set from inputted image data (Step 1, hereinafter, referred to as S1). Next, the data of the target pixel, inputted based upon the RGB color system, is converted to data of the XYZ color system (S2). Then, based upon expressions corresponding to respective cases provided by expression (19), the data of the XYZ color system is converted to a revised L*a*b* color system (S3) based upon expression (20).

Next, based upon the pixel data converted to the revised L*a*b* color system, the chrominance is calculated between the target pixel and each of the adjacent 8 pixels (S4). Then, among these chrominances, the greatest value is stored as the chrominance differential value (S5).

Further, at S6, it is confirmed whether or not calculations on the chrominance differential value have been completed with respect to all the pixels, and if the calculations have not been completed, the sequence proceeds to S1, and the above-mentioned processes are again repeated.

Here, it is possible to extract border lines in the inputted image by using the chrominance differential value obtained as described above. For example, in the chrominance differential values of all the pixels, the pixels which account for 15% from the largest value are defined as 1, and the other pixels are defined as 0. Then, in the pixel data, those pixels corresponding to 0 and those pixels corresponding to 1 are plotted so as to give a distribution state, and any border line is extracted by providing line connections in the vicinity of the center of areas occupied by the pixels having 1. Moreover, in the above-mentioned example, the chrominance differential values are binarized into 0 and 1 so as to extract border lines; however, another method in which border lines are extracted by using not less than binary digits, that is, n-valued digits (n=3, 4, . . . ), may be used.

Figure 1:
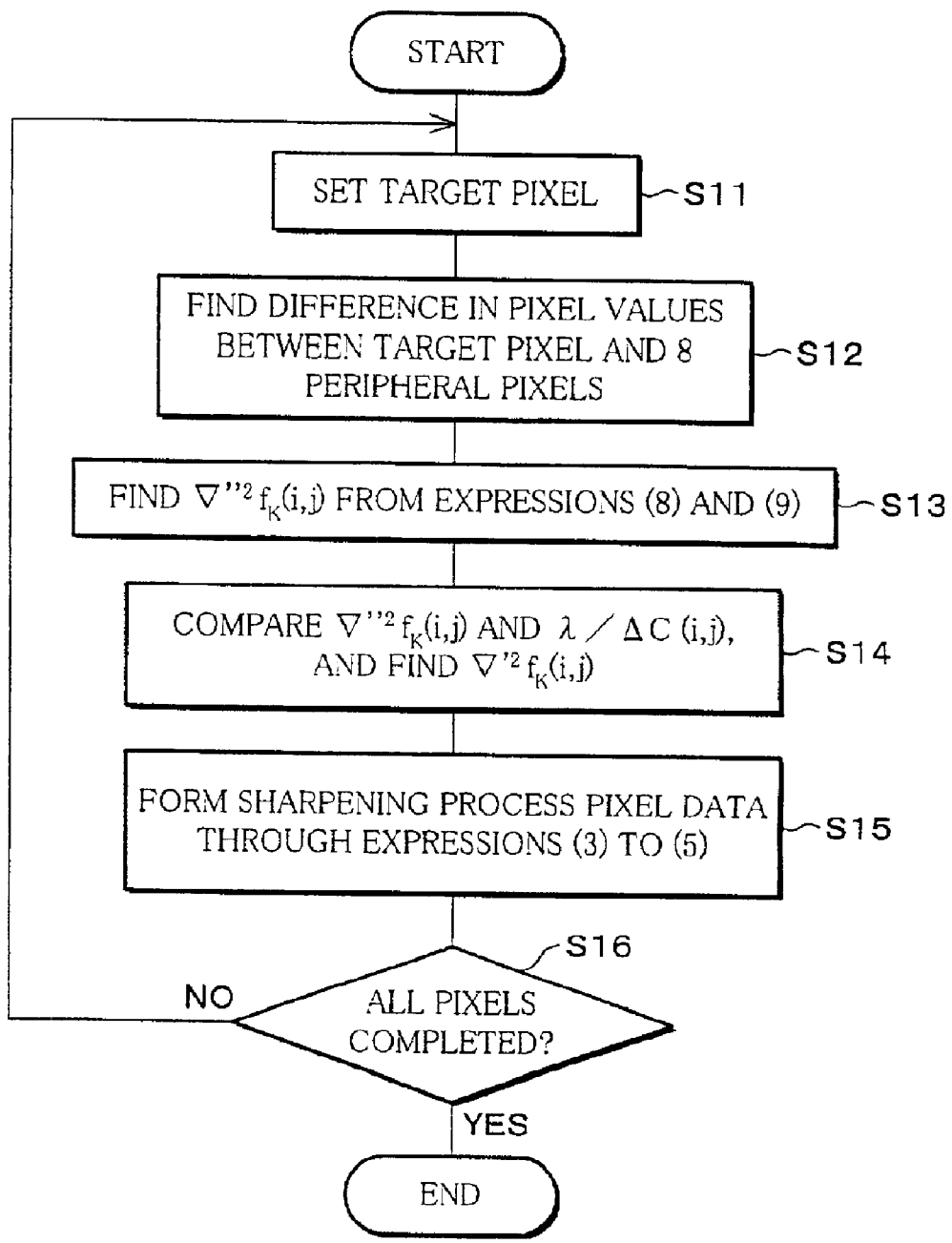
FIG. 1 is a flow chart that shows a sequence of sharpening processes by using a Laplacian operation in accordance with one embodiment of the present invention.

Next, referring to a flow chart of FIG. 1, an explanation will be given of a sequence of sharpening processes which are carried out by using the Laplacian operations in the present embodiment.

First, a target pixel is set in image data of an original image (S11). Then, a difference in pixel value is found between the target pixel and each of the eight pixels in the vicinity of the target pixel for each color component (S12). Based upon the difference, the coefficient of each term of expression (8) is determined by using expression (9) so that $\nabla''^2 f_K(i,j)$ is found (S13).

Next, a judgement is made as to whether $\nabla''^2 f_K(i,j)$ is positive or negative by using the above-mentioned expression (7), and the absolute value of $\nabla''^2 f_K(i,j)$ and λ/ΔC (i,j) are compared in their size, and the value of $\nabla'^2 f_K(i,j)$ is found from the above-mentioned expression (6)(S14). Based upon the value of $\nabla'^2 f_K(i,j)$ sharpening process pixel data is generated by using the above-mentioned expressions (3) to (5)(S15).

Then, at S16, it is confirmed whether or not the sharpening processes have been completed on all the pixels, and if not finished, the sequence proceeds to S11, and the above-mentioned processes are repeated.

As described above, in the sharpening process using the Laplacian operations in the present embodiment, it is possible to change the degree of the sharpening process by respectively changing the following factors: that is, the parameter k for controlling the degree of edge emphasis, used in expressions (3) through (5), the parameter λ for controlling the suppressing effect on an overshoot and an under shoot, used in expressions (6) and (7), and the parameter θ for controlling the suppressing effect on noise amplification, used in expressions (8) and (9). Therefore, it becomes possible to change the degree of sharpening functions in accordance with the usage and purpose of an image.

For example, in general, in a photograph image picked up as a snapshot image, in the case when a blurred portion appears on an area which should be in focus, conventional sharpening processes have the following problems: amplification of noise, occurrences of an overshoot and an undershoot and a sharpening process applied to an unnecessary portion that should be out of focus. In contrast, in the sharpening process in the present invention, the above-mentioned three parameters are appropriately changed so that the degree of the sharpening operation is weakened in an area which has already been in focus and an area which need not be in focus, and so that an appropriate sharpening process is applied to an area which has a blurred portion, even though it needs to be in focus.

Here, with respect to a method for setting the respective values of the three parameters, the present invention has proposed a method in which, while viewing an image on a display, etc. to which a sharpening process is being applied, the operator manually varies the respective parameters, and determines the respective parameters while confirming the degree of the sharpening operation. In this method, the operator is allowed to determine the parameters while confirming the state of the image that is being subjected to the sharpening process; therefore, it is possible for the operator to set the degree of the sharpening operation to a desired state of his or her own. However, in the case when a number of images have to be processed, problems arise with a lengthened processing time and an increased burden to the operator.

For this reason, a method for automatically setting the three parameters has been proposed. For example, from inputted image data, several kinds of data representing the features of the image data are extracted, and the corresponding data is inputted to a predetermined algorithm so that the three parameters are set. With respect to the above-mentioned algorithm, for example, those derived from neural networks and genetic algorithms, and other optimal solution retrieving algorithms may be adopted.

Here, when the sharpening process of the present embodiment is actually carried out, it is found that, among the three parameters, each of parameter λ and parameter θ has a wider range of values suitable for the sharpening process as compared with parameter k, although each of them has a comparatively small degree of change in the sharpening process in response to a change thereof. Therefore, even in a method in which parameter λ and parameter θ are set at appropriate values with parameter k being varied automatically in response to inputted image data, it becomes possible to sufficiently carry out a controlling process for the sharpening process. The following description will discuss this parameter setting method in which only parameter k is automatically set.

Here, first, an explanation will be given of the value of parameter k and the average value of the chrominance differential values (chrominance differential average).

Here, with respect to 40 sheets of sample images, the value of parameter k was changed to k=0.200, 0.400 and 0.600, and changes in the average value of the chrominance differential values were measured. FIG. 5 shows the average value of the chrominance differential values of the original image on the axis of abscissa, and also shows the average value of the chrominance differential values of the image after having been subjected to the sharpening operation on the axis of ordinate with respect to the values of k. In this manner, this Figure shows that the changes in the average value of the chrominance differential values are plotted on a virtually straight line passing through the original, with respect to each of the values of k. In other words, with respect to each of the values of k, the average value of the chrominance differential values of the image after having been subjected to the operation varies in proportion to the average value of the chrominance differential values of the original image. Here, the constant of proportionality can be found as described below.

Image numbers 1 to 40 are assigned to 40 sheets of sample images, and with respect to the images having respective image numbers i (i=1, 2, . . . , 40), the average value of the chrominance differential values of the original image is indicated by $\Delta C_0^i m$, and the average value of the chrominance differential values that have been subjected to the sharpening process with respect to parameter k is indicated by $\Delta C_k^i m$.

On the assumption that the average value of the chrominance differential values that have been subjected to the sharpening process with respect to parameter k is proportional to the average value of the chrominance differential values of the original image with a constant of proportionality of $a_k$, the error $\epsilon_i$ and the sum of squares S of the error $\epsilon_i$ are represented by the following expressions:

$$\epsilon_i = \Delta C_k^i m - (a_k \cdot \Delta C_0^i m) \tag{21}$$

$$S = \Sigma \epsilon_i^2 = \Sigma (\Delta C_k^i m - (a_k \cdot \Delta C_0^i m))^2 \tag{22}$$

In order to find the constant of proportionality $a_k$, the value of $a_k$ which minimizes the sum of squares S of the error $\epsilon_i$ is found. The value of $a_k$ for minimizing S is given by solving an equation with the first-order differential portions substituted by 0, as is given by equation (23) shown below, resulting in equation (24).

$$dS/da_k = -2\Sigma \Delta C_0^i m (\Delta C_k^i m - (ak \cdot \Delta C_0^i m)) = 0 \tag{23}$$

$$a_k = \Sigma (\Delta C_0^i m \cdot \Delta C_k^i m) / \Sigma (\Delta C_0^i m)^2 \tag{24}$$

In accordance with expression (24), constants of proportionality were found in the respective cases of k=0.200, 0.400 and 0.600, and the results are shown as follows:

$$\left. \begin{array}{l} a_{0.200} = 1.866 \\ a_{0.400} = 2.407 \\ a_{0.600} = 2.809 \end{array} \right\} \tag{25}$$

The results show that although the constant $a_k$ of proportionality increases as the value of k increases, the rate of increase decreases. In other words, as the value of k is allowed to increase, the average value of chrominance differential increases; however, the rate of the increase is allowed to decrease.

FIG. 6 shows a graph in which the value of k is plotted on the axis of abscissa with the constant of proportionality $a_k$ being plotted on the axis of ordinate in response to the value of k. As shown in FIG. 6, in a range where the value of k is comparatively small, the constant of proportionality $a_k$ increases in proportion to the increase of the value of k;

however, as the value of k increases, the rate of the increase of the constant of proportionality $a_k$ decreases. In other words, it is assumed that there is a value of k at which the increase of the constant of proportionality $a_k$ is saturated.

Here, it is defined that a straight line which is found based upon the proportional relationship in a range with a comparatively small value of k is an ideal straight line. In this case, as the value of k increases, the actual constant of proportionality $a_k$ comes to deviate from the ideal straight line. Taking this deviation from the ideal straight line into consideration, the following description will discuss a deviation judging method from the ideal straight line, which is used for determining the value of k that forms a saturated state.

It is assumed that the greater the average value of the chrominance differential of an original image, the more preferable it is to set the value of deviation from the ideal straight line to a greater value, in order to obtain better results of a sharpening process applied thereto. Here, for standardizing purposes, the relative chrominance differential average value $(\Delta C_{kn}m)_{rel}$ is defined by the following equation:

$$(\Delta C_{kn}m)_{rel} = \Delta C_{kn}m / \Delta C_{k0} \ (n=0, 1, 2, \ldots) \quad (26)$$

Moreover, assuming that the ideal straight line passes through the point corresponding to the original image (k0=0, $(\Delta C_{k0}m)_{rel}=1$), the gradient a is represented as follows by using two points (k1, $(\Delta C_{k1}m)_{rel}$), (k2, $(\Delta C_{k2}m)_{rel}$):

$$a = \frac{k1 \cdot \{(\Delta C_{k1}m)_{rel} - 1\} + k2 \cdot \{(\Delta C_{k1}m)_{rel} - 1\}}{k1^2 + k2^2} \quad (27)$$

Then, the deviation from the ideal straight line $\delta_{kn}$ is defined by the following equation:

$$\delta_{kn} = |(a \cdot kn+1) - (\Delta C_{kn}m)_{rel}| \ (n=1, 2, \ldots) \quad (28)$$

Here, when $\delta_{kn} \geq d$ is satisfied, it is judged that the deviation from the ideal straight line is great, that is, it is in a saturated state, and the minimum value of kn satisfying this relationship is defined as $k_{emph}$. This value $k_{emph}$ is set as a parameter k to be used in the above-mentioned sharpening process.

In the above-mentioned explanation, the value $k_{emph}$ is determined by using the deviation judging method from the ideal straight line; however, the present invention is not intended to be limited by this, and for example, a gradient rate-of-change judging method may be adopted.

The gradient rate-of-change judging method is a method in which, based upon the gradient of a graph formed by plotting chrominance differential average values, a judgement is made as to whether or not a saturated state has been reached by taking the rate of change into account. On the assumption that the gap of the parameter k for plotting the chrominance differential average values is 0.025, the value kn of the parameter k corresponding to the n-numbered one (n=0, 1, 2, . . . ) is represented by:

$$kn = 0.025 \times n \ (n=0, 1, 2, \ldots) \quad (29)$$

On the assumption that an image that has been subjected to a sharpening process with k=kn has a chrominance differential average value of $\Delta C_{kn}m$, data is plotted to form a graph, and the size of gradient $\Delta_{kn}$ of the graph thus plotted is defined by the following expressions. Here, in the following expressions, n=1, 2, . . .

$$\Delta_{kn} = (\Delta C_{kn}m - \Delta C_{kn-1}m)/\{kn - k(n-1)\} \quad (30)$$

By using this expression (30), the gradient rate-of-change $\rho_{kn}$ is defined by the following expression:

$$\rho_{kn} = (\Delta_{k1} - \Delta_{kn})/\Delta_{kn} \ (n=1, 2, \ldots) \quad (31)$$

Here, when $|\rho_{kn}| \geq p$ is satisfied, it is judged that a saturated state has been reached with a deviation from the straight line, and the minimum value of kn satisfying this expression is defined as $k_{emph}$.

In the deviation judging method from the ideal straight line, the experimental results show that when $\delta_{kn} \geq d$, which is considered to be a saturated state, $\delta_{kn}$ is allowed to increase monotonously. In contrast, in the gradient rate-of-change judging method, the experimental results show that when $|\rho_{kn}| \geq p$, which is considered to be a saturated state, $|\rho_{kn}|$ is not necessarily allowed to increase monotonously. In other words, even in a case where the value of k is great so as to be regarded as a saturated state providing sharp images, such a case might be regarded as a state failing to provide sharp images. Here, the gradient rate-of-change judging method provides plotted points having a more randomly dispersed property; therefore, in the case when the gap of the parameter k to be plotted is changed, there might be a possibility that a completely different value is selected as $k_{emph}$. As described above, it is considered that, upon setting the value $k_{emph}$ of the parameter k suitable for providing naturally sharpened images, the deviation judging method from the ideal straight line is more reliable.

Next, an explanation will be given of a method in which, in order to determine $k_{emph}$ by using the deviation judging method, the value of k is changed for each constant step and the corresponding deviation is calculated so as to retrieve the minimum value of the value k providing a saturated state.

Here, for example, it is supposed that a saturated state is attained in the case when k=0.500. In this case, in the above-mentioned retrieving process, supposing that the step at the time of changing the value of k is set to, for example, 0.025, the average value of chrominance differential has to be obtained 21 times until it has been judged that "the parameter $k_{emph}$ suitable for providing naturally sharpened images is 0.500"; thus, wasteful operations have to be carried out many times.

Therefore, by utilizing the facts that in the range of $\delta_{kn} \geq d$, the deviation $\delta_{kn}$ from the ideal straight line is allowed to increase monotonously, and that even when there is a difference of approximately 0.025 in the value of the parameter k, the slight difference in the processed image can not be discriminated by the naked eye, the above-mentioned step is set to 0.050. Here, since the same ideal straight line as used in the case of the step of 0.025 is adopted, after carrying out operations at the time of k=0.025, the step is set to 0.050 in the range of $k \geq 0.050$. By setting the step in this manner, the number of operations that are required for obtaining $k_{emph}$ is reduced to half.

However, even in the above-mentioned method, the number of operations that are required for obtaining $k_{emph}$ is as many as 12. Therefore, in order to further reduce the average of the numbers of operations that are required for obtaining $k_{emph}$, the order in which the operations are carried out is changed in accordance with the following algorithm. Here, the number of skips s to be used in the following algorithm needs to be found, and in the following description, the algorithm in the case of s=2 is shown.

First, the relative average values of chrominance differential with respect to k=0.000, 0.025 and 0.050 are found, and an ideal straight line is found in accordance with equation (27). Then, the value of the parameter k to be plotted is skipped by the number of skips s, and with respect to k=0.200, 0.350 and 0.500, the relative average values of chrominance differential are found. Then, deviations from the ideal straight line at the respective values are also found, and the value of k that has first satisfied $\delta_{kn} \geq d$ is defined as k(2). Moreover, with respect to k(2)−0.100 and k(2)−0.050, the relative average values of chrominance differential are found, and deviations from the ideal straight line are found at the respective values. With respect to the resulting values, if $\delta_{kn} \geq d$ is satisfied, the value k at this time is defined as $k_{emph}$, and if none of them satisfy $\delta_{kn} \geq d$, k(2) is defined as $k_{emph}$.

In accordance with the above-mentioned algorithm, the average number of plots can be reduced while selecting the same values as $k_{emph}$ as the values obtained by successively plotting in the case of the step of 0.050. For example, in the case of $k_{emph}$=0.500, the number of operations for obtaining the average values of chrominance differential that are required for obtaining this value is reduced to 8 times.

Figure 4:
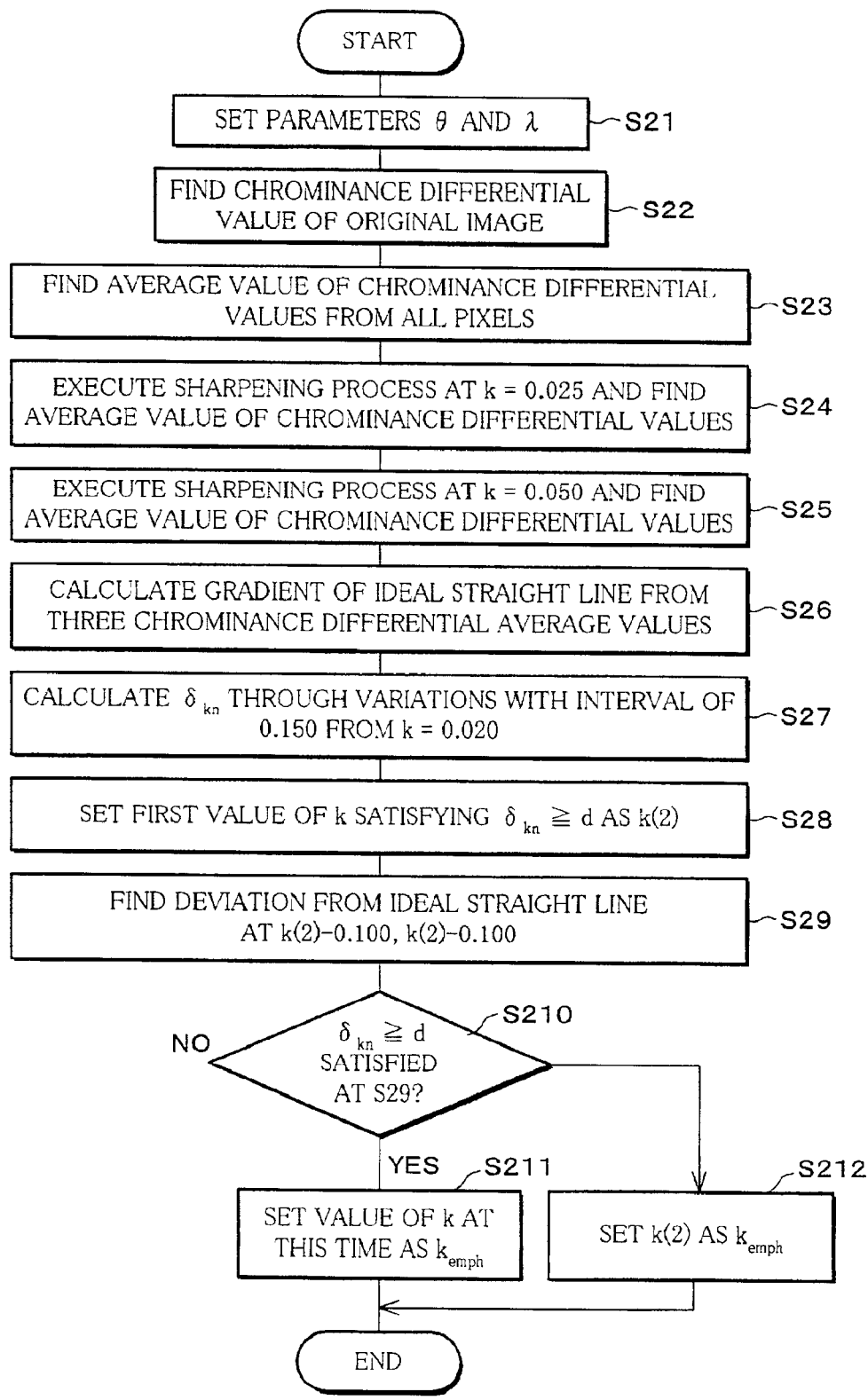
FIG. 4 is a flow chart that shows a sequence of a setting method in which the parameter λ and parameter θ are set at appropriate values and the parameter k is found through a deviation judging method from the ideal straight line.
Figure 7:
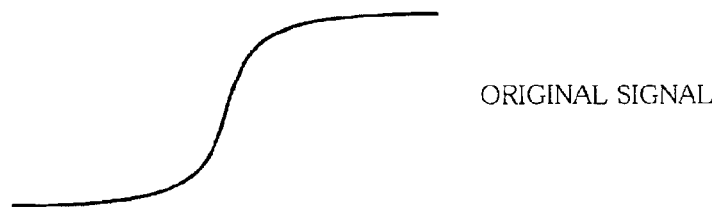
FIG. 7(a) is an explanatory drawing that shows original image pixel data in which respective pixels are plotted in the horizontal direction and pixel values are plotted in the vertical direction.
FIG. 7(b) shows the first-order differential value of an original image.
FIG. 7(c) shows the Laplacian value of image data of the original image.
FIG. 7(d) is an explanatory drawing that shows the value (original image pixel data)−(Laplacian value) that is obtained by expression (1).
Figure 7:
Figure 7:
Figure 7:
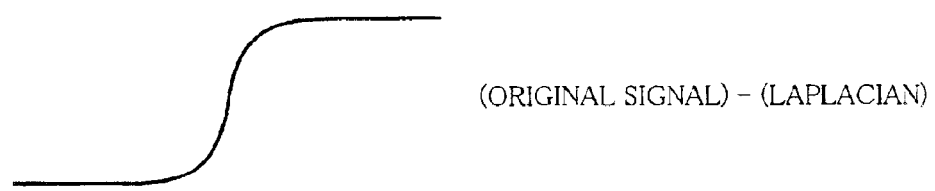
Figure 8A:
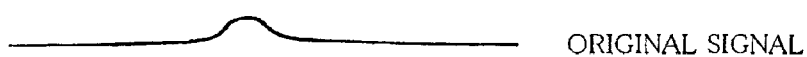
FIG. 8(a) is an explanatory drawing that shows original image pixel data in an image having noise, in which respective pixels are plotted in the horizontal direction and pixel values are plotted in the vertical direction.
Figure 8B:
FIG. 8(b) is an explanatory drawing that shows the value (original image pixel data)−(Laplacian value) that is obtained by expression (1).

Next, referring to a flow chart of FIG. 4, as one embodiment of a sharpening process, an explanation will be given of a method in which, after the parameter λ and parameter θ have been set to appropriate values, the parameter k is set by using the deviation judging method from the ideal straight line, as described above.

First, at S21, the values of the parameter λ and parameter θ are set. These set values are given as fixed values properly determined based upon the results of experiments.

Next at S22, with respect to each pixel, a chrominance differential value Δc(i,j) is found from an original signal that has been inputted as an image to be subjected to a sharpening process. Then, based upon the chrominance differential values Δc(i,j) obtained for all the pixels, a chrominance differential average value $\Delta C_0 m$ in the original signal is found (S23). Here, the chrominance differential average value in the original signal is equal to a chrominance differential average value in a sharpened image at the time when the parameter k is set to 0.

Next, at S24, a sharpened image is formed in a state where k=0.025, and with respect to each pixel, a chrominance differential value Δc(i,j) is found, and a chrominance differential average value $\Delta C_0 m$ in the sharpened image is found. In the same manner, at S25, a sharpened image is formed in a state where k=0.050, and with respect to each pixel, a chrominance differential value Δc(i,j) is found, and a chrominance differential average value $\Delta C_0 m$ in the sharpened image is found.

Then, based upon the chrominance differential average value in the original signal found at S23, the chrominance differential average value in a state where k=0.025 found at S24 and the chrominance differential average value in a state where k=0.050 found at S25, the gradient of the ideal straight line is calculated (S26).

Next, while varying the value of k in the range between k=0.200 to 0.150, deviations from the ideal straight line $\delta_{kn}$ are calculated at the respective values of k (S27). Then, the value of k that has first satisfied the deviation from the ideal straight line $\delta_{kn} \geq d$ is defined as k(2)(S28).

Next, with respect to k(2)−0.100 and k(2)−0.050, the relative average values of chrominance differential are found, and deviations from the ideal straight line are found at the respective values (S29). With respect to the resulting values, if $\delta_{kn} \geq d$ is satisfied (YES(Y) at S210), the value k at this time is defined as $k_{emph}$(S211), and if none of them satisfy $\delta_{kn} \geq d$ (NO(N) at S210), k(2) is defined as $k_{emph}$ (S212).

Then, the above-mentioned $k_{emph}$ is set as k, and a sharpening process is carried out on the inputted original image by using the parameter λ and parameter θ that have been set at S21 (S213), thereby completing the processes.

The image outputting method as described above can be realized by a program for executing the sharpening process for images. This program is stored in a recording medium which can be read by computers. In this case, the image processing device 2, shown in FIG. 2, is provided with a computer. Then, with respect to the above-mentioned recording medium, examples thereof include: a memory which is required by a microcomputer for carrying out processes, included in a computer constituting the image processing device 2, for example, a ROM which serves as a program medium, or a program medium that is readable when inserted as a recording medium into a program-reading device installed as an external memory device.

In any of the cases, the stored program may be accessed by a microprocessor provided in the computer, and then executed, or may be read out, and the readout program is downloaded to a program memory area of a microcomputer, and the program is then executed. A program used for this downloading process is supposed to be preliminarily stored in the main device.

Here, the above-mentioned program medium may be a recording medium that is allowed to separate from a main body, for example, tapes such as magnetic tapes and cassette tapes, magnetic discs such as floppy disks and hard disks, discs such as optical discs including CD-ROMs/MOs/MDs/DVDs, etc., and cards such as optical cards, or a medium for fixedly bearing the program, including semiconductor memories, such as mask ROMS, EPROMs, EEPROMs, flash ROMs, etc.

Moreover, in the present invention, a system construction which can be connected to a communication network, such as the Internet, may be used, and the media may be those which temporarily bear a program that is, for example, downloaded through the communication network. Here, in the case when the program is downloaded through the communication network, the program used for the downloading process may be preliminarily stored in the main device, or may be installed from another recording medium.

Here, with respect to the contents stored in a recording medium, they are not limited to a program, and may be provided as data.

As described above, the image-processing method in accordance with the present invention, which is an image-processing method for carrying out a sharpening process by subtracting second-order differential with respect to each pixel, obtained by defining the distribution of image data of an original image as a function, from the image data of the original image, and in this method, the degree of the sharpening process is controlled by altering a first parameter for determining the size of the second-order differential to be subtracted from the image data of the original image.

In the above-mentioned method, data that is representative of the characteristic of the image data is extracted from the inputted image data, and the first parameter may be set by inputting this data to a predetermined algorithm.

In this method, the first parameter is set by extracting the data representative of the characteristic of the image data from the inputted image data and inputting the resulting data to the predetermined algorithm; therefore, it is possible to reduce the processing time and the load imposed on the operator even in the case when a number of images have to be processed.

Moreover, the above-mentioned image-processing method in accordance with the present invention is an image-processing method for carrying out a sharpening process by subtracting second-order differential with respect to each pixel, obtained by defining the distribution of image data of an original image as a function, from the image data of the original image, and in this method, the second-order differential is obtained by the sum total of differences between a target pixel and a plurality of pixels in the vicinity thereof, and each of the differences is multiplied by a coefficient, with the coefficient being varied depending on the size of the corresponding difference.

Here, in the above-mentioned method, the coefficient may be set so as to have different values depending on the cases in which the difference is greater than the second parameter and in which the difference is smaller than the second parameter, and the degree of the sharpening process may be controlled by altering the above-mentioned second parameter.

In the above-mentioned method, the coefficient is set so as to have different values depending on the cases in which the difference is greater than the second parameter and in which the difference is smaller than the second parameter. For example, in the is case when the above-mentioned coefficient is set so as to have a greater value in the case of the difference greater than the second parameter, and also to have a smaller value in the case of the difference smaller than the second parameter, even if, for example, slight noise appears on the peripheral pixels, it is possible to regulate the second-order differential from including the influences of the noise, in the same manner as the above-mentioned method. Moreover, by altering the second parameter in accordance with the image state of an original image, it is possible to carry out an image process so as to obtain a desirable sharpened state.

Furthermore, in the above-mentioned image-processing method, data that is representative of the characteristic of the image data is extracted from the inputted image data, and the second parameter may be set by inputting this data to a predetermined algorithm.

In this method, the second parameter is set by extracting the data representative of the characteristic of the image data from the inputted image data and inputting the resulting data to the predetermined algorithm; therefore, it is possible to reduce the processing time and the load imposed on the operator even in the case when a number of images have to be processed.

Moreover, the above-mentioned image-processing method in accordance with the present invention is an image-processing method for carrying out a sharpening process by subtracting second-order differential with respect to each pixel, obtained by defining the distribution of image data of an original image as a function, from the image data of the original image, and in this method, the second-order differential is provided with an upper limit and/or a lower limit, and the degree of the sharpening process is controlled by altering a third parameter for determining the upper limit and/or the lower limit.

In the above-mentioned method, the upper limit and/or the lower limit may be determined by a value obtained by dividing the third parameter by a chrominance differential value.

In accordance with the above-mentioned method, the upper limit and/or the lower limit is determined by a value obtained by dividing the third parameter by the chrominance differential value. The area having a great chrominance differential value refers to an area where there is a sharp edge, and the area having a small chrominance differential value refers to an area where there is a less-distinct edge. In other words, in the area where there is a sharp edge in an original image, the absolute value of the upper limit and/or the lower limit becomes smaller, and in the area where there is a less-distinct edge, the absolute value of the upper limit and/or the lower limit becomes greater. More specifically, with respect to the area where the edge has already been emphasized sufficiently, the absolute value of the upper limit and/or the lower limit becomes small so that it is possible to prevent the second-order differential from becoming too great, and consequently to regulate the sharpening process from being carried out to an unnecessary high extent. Moreover, with respect to the area where there is blurring to a certain extent in the original image, the absolute value of the upper limit and/or lower limit becomes great so that it is possible to prevent the second-order differential becomes comparatively great, making it possible to carry out the sharpening process appropriately.

Furthermore, in the above-mentioned image-processing method, data that is representative of the characteristic of the image data is extracted from the inputted image data, and the third parameter may be set by inputting this data to a predetermined algorithm.

In this method, the third parameter is set by extracting the data representative of the characteristic of the image data from the inputted image data and inputting the resulting data to the predetermined algorithm; therefore, it is possible to reduce the processing time and the load imposed on the operator even in the case when a number of images have to be processed.

Moreover, in the above-mentioned image-processing method, the sharpening process using the second-order differential may be carried out on pixel data of the original image for each of color components.

In the above-mentioned method the Laplacian operation is executed on each of the color components; therefore, even in the case where, in an original image, an edge is formed by variations in hues although the density differences are virtually the same, this area is recognized as an edge and the edge emphasizing process is carried out thereon properly.

Moreover, the recording medium in which the image-processing program in accordance with the present invention is recorded is a recording medium in which is recorded an image-processing program for allowing a computer to carry out a sharpening process by subtracting second-order differential with respect to each pixel, obtained by defining the distribution of image data of an original image as a function, from the image data of the original image, and in this arrangement, the computer is allowed to execute a process for controlling the degree of the sharpening process altering a first parameter for determining the size of the second-order differential to be subtracted from the image data of the original image.

In the above-mentioned program, the computer may be arranged to execute processes in which data that is representative of the characteristic of the image data is extracted from the inputted image data, and the first parameter is set by inputting this data to a predetermined algorithm.

In accordance with the program recorded in the recording medium, the first parameter is set by extracting the data representative of the characteristic of the image data from the inputted image data and inputting the resulting data to the predetermined algorithm; therefore, it is possible to reduce the processing time and the load imposed on the operator even in the case when a number of images have to be processed.

Moreover, the recording medium in which the image-processing program in accordance with the present invention is recorded, is a recording medium in which is recorded an image-processing program for allowing a computer to carry out a sharpening process by subtracting second-order differential with respect to each pixel, obtained by defining the distribution of image data of an original image as a function, from the image data of the original image, and in this arrangement, the computer is allowed to execute processes for obtaining the second-order differential by the sum total of differences between a target pixel and a plurality of pixels in the vicinity thereof, and for multiplying each of the differences by a coefficient, with the coefficient being varied depending on the size of the corresponding difference.

Here, in the above-mentioned program, the computer may be arranged to execute processes in which the coefficient is set so as to have different values depending on the cases in which the difference is greater than the second parameter and in which the difference is smaller than the second parameter, and the degree of the sharpening process is controlled by altering the above-mentioned second parameter.

In accordance with the program recorded in the recording medium, the coefficient is set so as to have different values depending on the cases in which the difference is greater than the second parameter and in which the difference is smaller than the second parameter. For example, in the case when the above-mentioned coefficient is set so as to have a greater value in the case of the difference greater than the second parameter, and also to have a smaller value in the case of the difference smaller than the second parameter, even if, for example, slight noise appears on the peripheral pixels, it is possible to regulate the second-order differential from including the influences of the noise, in the same manner as the above-mentioned method. Moreover, by altering the second parameter in accordance with the image state of an original image, it is possible to carry out an image process so as to obtain a desirable sharpened state.

Furthermore, the recording medium in which the image-processing program is recorded may allow the computer to executes the following processes: data that is representative of the characteristic of the image data is extracted from the inputted image data, and the second parameter may be set by inputting this data to a predetermined algorithm.

In accordance with the recording medium in which the image-processing program is recorded, the second parameter is set by extracting the data representative of the characteristic of the image data from the inputted image data and inputting the resulting data to the predetermined algorithm; therefore, it is possible to reduce the processing time and the load imposed on the operator even in the case when a number of images have to be processed.

Moreover, the recording medium in which the image-processing program in accordance with the present invention is recorded, is a recording medium in which is recorded an image-processing program for allowing a computer to carry out a sharpening process by subtracting second-order differential with respect to each pixel, obtained by defining the distribution of image data of an original image as a function, from the image data of the original image. In this arrangement the second-order differential is provided with an upper limit and/or a lower limit, and the computer is allowed to execute processes for determining the upper limit and/or the lower limit by altering a third parameter so as to control the degree of the sharpening process.

Here, the recording medium in which the image-processing program is recorded may allow the computer to executes the following processes: the upper limit and/or the lower limit is determined by a value obtained by dividing the third parameter by a chrominance differential value.

In accordance with the recording medium in which the image-processing program is recorded, the upper limit and/or the lower limit is determined by a value obtained by dividing the third parameter by the chrominance differential value. The area having a great chrominance differential value refers to an area where there is a sharp edge, and the area having a small chrominance differential value refers to an area where there is a less-distinct edge. In other words, in the area where there is a sharp edge in an original image, the absolute value of the upper limit and/or the lower limit becomes smaller, and in the area where there is a less-distinct edge, the absolute value of the upper limit and/or the lower limit becomes greater. More specifically, with respect to the area where the edge has already been emphasized sufficiently, the absolute value of the upper limit and/or the lower limit becomes small so that it is possible to prevent the second-order differential from becoming too great, and consequently to regulate the sharpening process from being carried out to an unnecessary high extent.

Moreover, with respect to the area where there is blurring to a certain extent in the original image, the absolute value of the upper limit and/or lower limit becomes great so that it is possible to prevent the second-order differential becomes comparatively great, making it possible to carry out the sharpening process appropriately.

Here, the recording medium in which the image-processing program is recorded may allow the computer to executes the following processes: data that is representative of the characteristic of the image data is extracted from the inputted image data, and the third parameter is set by inputting this data to a predetermined algorithm.

In accordance with the program recorded in the recording medium, the third parameter is set by extracting the data representative of the characteristic of the image data from the inputted image data and inputting the resulting data to the predetermined algorithm; therefore, it is possible to reduce the processing time and the load imposed on the operator even in the case when a number of images have to be processed.

Moreover, in accordance with the recording medium in which the image-processing program is recorded, the sharpening process using the second-order differential may be carried out on pixel data of the original image for each of color components.

In accordance with the program recorded in the recording medium, the second-order differential operation is executed on each of the color components; therefore, even in the case where, in an original image, an edge is formed by variations in hues although the density differences are virtually the same, this area is recognized as an edge and the edge emphasizing process is carried out thereon properly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image-processing method, which carries out a sharpening process by subtracting from the image data of the original image, the second-order differential with respect to each pixel, the second order differential being obtained by 1) defining the distribution of image data of an original image as a function, and 2) taking the Laplacian of that function, wherein the degree of the sharpening process is controlled by altering according to image data subjected to the sharpening process, a first parameter for determining the size of the second-order differential to be subtracted from the image data of the original image.

2. The image-processing method as defined in claim 1, wherein: data that is representative of the characteristic of the image data is extracted from the inputted image data, and the first parameter is set by inputting this data to a predetermined algorithm.

3. An image-processing method which carries out a sharpening process by subtracting from the image data of the original image the second-order differential with respect to each pixel, the second order differential being obtained by 1) defining the distribution of image data of an original image as a function, and 2) taking the Laplacian of that function;

wherein the degree of the sharpening process is controlled by altering a first parameter for determining the size of the second-order differential to be subtracted from the image data of the original image;

wherein data that is representative of the characteristic of the image data is extracted from the inputted image data, and the first parameter is set by inputting this data to a predetermined algorithm; and wherein the data that is representative of the characteristic of the image data is an average value of chrominance differential values of respective pixels contained in the image data.

4. The image-processing method as defined in claim 3, wherein the predetermined algorithm sets the value of the first parameter which allows the difference between a function for finding the average value of chrominance differential values that varies with the first parameter and an ideal straight line that varies in proportion to the first parameter to become not less than a predetermined value, as the first parameter determining the size of the second-order differential.

5. The image-processing method as defined in claim 1, wherein the sharpening process using the second-order differential is carried out on pixel data of the original image for each of color components.

6. An image-processing method, which carries out a sharpening process by subtracting from the image data of the original image the second-order differential with respect to each pixel, the second order differential being obtained by first defining the distribution of image data of an original image as a function, wherein: the second-order differential is obtained by the sum total of differences in value between a target pixel and a plurality of pixels in the vicinity thereof, and each of the differences is multiplied by a coefficient, with the coefficient being varied depending on the size of the corresponding difference.

7. The image-processing method as defined in claim 6, wherein: the coefficient is set to be different values depending on cases in which the difference is greater than a second parameter and in which the difference is smaller than the second parameter, and the degree of the sharpening process is controlled by altering the second parameter.

8. An image-processing method which carries out a sharpening process by subtracting from the image data of the original image the second-order differential with respect to each pixel, the second order differential being obtained by first defining the distribution of image data of an original image as a function, wherein: the second-order differential is obtained by the sum total of differences in value between a target pixel and a plurality of pixels in the vicinity thereof, and each of the differences is multiplied by a coefficient, with the coefficient being varied depending on the size of the corresponding difference;

wherein the coefficient is set to be different values depending on cases in which the difference is greater than a second parameter and in which the difference is smaller than the second parameter, and the degree of the sharpening process is controlled by altering the second parameter; and wherein data that is representative of the characteristic of the image data is extracted from the inputted image data, and the second parameter is set by inputting this data to a predetermined algorithm.

9. The image-processing method as defined in claim 6, wherein the sharpening process using the second-order differential is carried out on pixel data of the original image for each of color components.

10. An image-processing method, which carries out a sharpening process by subtracting from the image data of the original image the second-order differential with respect to each pixel, the second order differential being obtained by 1) defining the distribution of image data of an original image as a function, and 2) taking the Laplacian of that function, wherein the second-order differential has at least one of an upper limit and a lower limit, and the degree of the sharpening process is controlled by altering a third parameter for determining the upper limit and/or the lower limit.

11. The image-processing method as defined in claim 10, wherein said at least one of an upper limit and the lower limit is determined by a value obtained by dividing the third parameter by a chrominance differential value.

12. The image-processing method as defined in claim 10, wherein: data that is representative of the characteristic of the image data is extracted from the inputted image data, and the third parameter is set by inputting this data to a predetermined algorithm.

13. The image-processing method as defined in claim 10, wherein the sharpening process using the second-order differential is carried out on pixel data of the original image for each of color components.

14. A recording medium, which has an image-processing program recorded therein, the image-processing program being arranged to allow a computer to carry out a sharpening process by subtracting from the image data of the original image the second-order differential with respect to each pixel, the second order differential obtained by 1) defining the distribution of image data of an original image as a function, and 2) taking the Laplacian of that function, wherein the computer is allowed to execute a process for controlling the degree of the sharpening process by altering according to image data subjected to the sharpening process, a first parameter for determining the size of the second-order differential to be subtracted from the image data of the original image.

15. A recording medium which has an image processing program recorded therein, the image-processing program being arranged to allow a computer to carry out a sharpening process by subtracting from the image data of the original image the second-order differential with respect to each pixel, the second order differential obtained by 1) defining the distribution of image data of an original image as a function, and 2) taking the Laplacian of that function, wherein the computer is allowed to execute a process for controlling the degree of the sharpening process altering a first parameter for determining the size of the second-order differential to be subtracted from the image data of the original image; and wherein: the computer is arranged to execute processes in which data that is representative of the characteristic of the image data is extracted from the inputted image data, and the first parameter is set by inputting this data to a predetermined algorithm.

16. The recording medium as defined in claim 15, which has an image-processing program recorded therein,
wherein: the data that is representative of the characteristic of the image data is an average value of chrominance differential values of respective pixels contained in the image data.

17. The recording medium as defined in claim 16, which has an image-processing program recorded therein,
wherein the predetermined algorithm sets the value of the first parameter which allows the difference between a function for finding the average value of chrominance differential values that varies with the first parameter and an ideal straight line that varies in proportion to the first parameter to become not less than a predetermined value, as the first parameter determining the size of the second-order differential.

18. The recording medium as defined in claim 14, which has an image-processing program recorded therein,
wherein the sharpening process using the second-order differential is carried out on pixel data of the original image for each of color components.

19. A recording medium, which has an image-processing program recorded therein, the image-processing program being arranged to allow a computer to carry out a sharpening process by subtracting from the image data of the original image the second-order differential with respect to each pixel, the second order differential being obtained by first defining the distribution of image data of an original image as a function,
the computer being allowed to execute a process wherein: the second-order differential is obtained by the sum total of differences between a target pixel and a plurality of pixels in the vicinity thereof, and each of the differences is multiplied by a coefficient, with the coefficient being varied depending on the size of the corresponding difference.

20. The recording medium as defined in claim 19, which has an image-processing program recorded therein,
wherein the computer is allowed to execute a process wherein: the coefficient is set to be different values depending on cases in which the difference is greater than a second parameter and in which the difference is smaller than the second parameter, and the degree of the sharpening process is controlled by altering the second parameter.

21. A recording medium, which has an image processing program recorded therein, the image-processing program being arranged to allow a computer to carry out a sharpening process by subtracting from the image data of the original image the second-order differential with respect to each pixel, the second order differential being obtained by first defining the distribution of image data of an original image as a function,
the computer being allowed to execute a process wherein: the second-order differential is obtained by the sum total of differences between a target pixel and a plurality of pixels in the vicinity thereof, and each of the differences is multiplied by a coefficient, with the coefficient being varied depending on the size of the corresponding difference;
wherein the computer is allowed to execute a process wherein: the coefficient is set to be different values depending on cases in which the difference is greater than a second parameter and in which the difference is smaller than the second parameter, and the degree of the sharpening process is controlled by altering the second parameter, and
wherein: the computer is arranged to execute processes in which data that is representative of the characteristic of the image data is extracted from the inputted image data, and the second parameter is set by inputting this data to a predetermined algorithm.

22. The recording medium as defined in claim 19, which has an image-processing program recorded therein,
wherein the sharpening process using the second-order differential is carried out on pixel data of the original image for each of color components.

23. A recording medium, which has an image-processing program recorded therein, the image-processing program being arranged to allow a computer to carry out a sharpening process by subtracting from the image data of the original image the second-order differential with respect to each pixel, the second order differential being obtained by 1) defining the distribution of image data of an original image as a function, and 2) taking the Laplacian of that function,
the computer being allowed to execute a process wherein: the second-order differential is provided with at least one of an upper limit and/or a lower limit, and the degree of the sharpening process is controlled by altering a third parameter for determining the upper limit and/or the lower limit.

24. The recording medium as defined in claim 23, which has an image-processing program recorded therein,
wherein the computer is allowed to execute a process wherein: at least one of the upper limit and the lower limit is determined by a value obtained by dividing the third parameter by a chrominance differential value.

25. The recording medium as defined in claim 23, which has an image-processing program recorded therein,
wherein the computer is allowed to execute a process wherein: data that is representative of the characteristic of the image data is extracted from the inputted image data, and the third parameter is set by inputting this data to a predetermined algorithm.

26. The recording medium as defined in claim 23, which has an image-processing program recorded therein,
wherein the computer is allowed to execute a process wherein: the sharpening process using the second-order differential is carried out on pixel data of the original image for each of color components.

27. An image-processing method, wherein a sharpening process is carried out based on the following equation:

$$g(i, j)=f(i, j)-k\nabla'^2 f(i, j),$$

wherein f(i,j) is a pixel value of a target pixel in an original image, g(i,j) is a pixel value of the target pixel after carrying out the sharpening process with respect to the original image, and $\nabla'^2 f(i,j)$ is a function obtained by carrying out a Laplacian process based on the pixel value of the target pixel and pixel values of a plurality of pixels adjacent to the target pixel, and
a resulting output value of g(i,j) from the sharpening process is adjusted by altering a value "k" variable according to image data subjected to the sharpening process.

28. An image processing method, wherein a sharpening process is carried out based on the following equation:

$$g(i, j)=f(i, j)-k\nabla'^2 f(i, j),$$

wherein f(i,j) is a pixel value of a target pixel in an original image, g(i,j) is a pixel value of the target pixel after carrying out the sharpening process with respect to the original image, and $\nabla'^2 f(i,j)$ is a function obtained by carrying out a Laplacian process based on the pixel value of the target pixel and pixel values of a plurality of pixels adjacent to the target pixel, and a resulting output value of g(i,j) from the sharpening process is adjusted by setting a value "k" variable, in the Laplacian process, adjacent pixels whose pixel values are not different from that of the target value by more than a parameter θ are not subjected to the Laplacian process; and a resulting output value for g(i,j) from the sharpening process is adjusted using the parameter θ which is a set variable.

29. An image processing method wherein An image-processing method, wherein a sharpening process is carried out based on the following equation:

$$g(i, j)=f(i, j)-k\nabla'^2 f(i, j),$$

wherein f(i, j ) is a pixel value of a target pixel in an original image, g(i,j) is a pixel value of the target pixel after carrying out the sharpening process with respect to the original image, and $\nabla'^2 f(i,j)$ is a function obtained by carrying out a Laplacian process based on the pixel value of the target pixel and pixel values of a plurality of pixels adjacent to the target pixel, and a resulting output value of g(i,j) from the sharpening process is adjusted by setting a value "k" variable, said function has at least one of an upper limit and a lower limit;

said upper limit or said lower limit is a set variable;

said upper limit or said lower limit which is a set variable is obtained by dividing a parameter λ by a chrominance difference value between said target pixel and one of the pixels adjacent to said target pixel; and a resulting output value g(i,j) from the sharpening process is adjusted using the parameter λ which is a set variable.

30. The image processing method as set forth in claim 29, wherein:

of all the pixels adjacent to said target pixel, said one of the pixels adjacent to said target pixel has the largest chrominance difference value from said target pixel.

31. An image-processing method, wherein a sharpening process is carried out based on the following equation:

$$g(i, j)=f(i, j)-k\nabla'^2 f(i, j),$$

wherein f (i,j) is a pixel value of a target pixel in an original image, g(i,j) is a pixel value of the target pixel after carrying out the sharpening process with respect to the original image, and $\nabla'^2 f(i,j)$ is a function obtained by carrying out Laplacian process based on the pixel value of said target pixel and pixel values of a plurality of pixels adjacent to said target pixel, and in the Laplacian process, adjacent pixels whose pixel values are not different from that of the target value by more than a parameter θ are not subjected to the Laplacian process; and a resulting output value for g(i,j) from the sharpening process is adjusted using the parameter θ which is a set variable.

32. The image processing method as set forth in claim 31, wherein:

said function has at least one of an upper limit and a lower limit;

said upper limit or said lower limit is a set variable;

said upper limit or said lower limit which is a set variable is obtained by dividing a parameter λ by a chrominance difference value between said target pixel and one of the pixels adjacent to said target pixel; and a resulting output value g(i,j) from the sharpening process is adjusted using the parameter λ which is a set variable.

33. The image processing method as set forth in claim 32, wherein:

of all the pixels adjacent to said target pixel, said one of the pixels adjacent to said target pixel has a largest chrominance difference value from said target pixel.

34. An image-processing method, wherein a sharpening process is carried out based on the following equation:

$$g(i, j)=f(i, j)-k\nabla'^2 f(i, j),$$

wherein f(i,j) is a pixel value of a target pixel in an original image, g(i,j) is a pixel value of said target pixel after carrying out the sharpening process with respect to the original image, and $\nabla'^2 f(i,j)$ is a function obtained by carrying out Laplacian process based on the pixel value of said target pixel and pixel values of a plurality of pixels adjacent to said target pixel, and said function has at least one of an upper limit and a lower limit;

said upper limit or said lower limit is a set variable;

said upper limit or said lower limit which is a set variable is obtained by dividing a parameter λ by a chrominance difference value between said target pixel and one of the pixels adjacent to said target pixel; and a resulting output value g(i,j) from the sharpening process is adjusted using the parameter λ which is a set variable.

35. The image processing method as set forth in claim 34, wherein:

of all the pixels adjacent to said target pixel, said one of the pixels adjacent to said target pixel has a largest chrominance difference value from said target pixel.

* * * * *